(12) United States Patent
Rimmer et al.

(10) Patent No.: US 12,067,342 B2
(45) Date of Patent: *Aug. 20, 2024

(54) AUTOMATICALLY DETERMINING A SIZE FOR A CONTENT ITEM FOR A WEB PAGE

(71) Applicant: GOOGLE LLC, Mountain View, CA (US)

(72) Inventors: Graeme John Rimmer, Twickenham (GB); Lewis Jay Hemens, London (GB)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/112,003

(22) Filed: Feb. 21, 2023

(65) Prior Publication Data

US 2023/0205976 A1 Jun. 29, 2023

Related U.S. Application Data

(63) Continuation of application No. 17/475,334, filed on Sep. 14, 2021, now Pat. No. 11,586,801, which is a (Continued)

(51) Int. Cl.
*G06F 40/103* (2020.01)
(52) U.S. Cl.
CPC .................. *G06F 40/103* (2020.01)
(58) Field of Classification Search
None
See application file for complete search history.

(56) References Cited

U.S. PATENT DOCUMENTS

| | | |
|---|---|---|
| 4,603,430 A | 7/1986 | Sacks |
| 5,542,107 A | 7/1996 | Kay |

(Continued)

FOREIGN PATENT DOCUMENTS

| | | |
|---|---|---|
| CA | 2633177 A1 | 12/2009 |
| CN | 101410815 A | 4/2009 |

(Continued)

OTHER PUBLICATIONS

Lardinois, Frederic, Google Launches New Ad Unit for Responsive Sites, Google AdSense,http://techcrunch.com/2013/07/31/google-launches-new-ad-unit-for-responsi- ve-sites/, Jul. 31, 2013, 3 pgs.

(Continued)

*Primary Examiner* — Howard Cortes
(74) *Attorney, Agent, or Firm* — MARSHALL, GERSTEIN & BORUN LLP

(57) ABSTRACT

A method for selecting and serving a content item includes serving a script to a client device in response to a request, where the script is configured to determine a size of a viewport, determine a width of a parent element of a resource, and determine a content item size based, at least in part, on the size of the viewport and the width of the parent element. The method also includes receiving information indicative of the determined content item size, determining a set of content items based, at least in part, on the received information indicative of the determined content item size, selecting a content item from the determined set of content items, and serving data to effect display of the selected content item in the parent element with the resource.

20 Claims, 9 Drawing Sheets

Related U.S. Application Data continuation of application No. 16/586,271, filed on Sep. 27, 2019, now Pat. No. 11,120,194, which is a continuation of application No. 15/621,806, filed on Jun. 13, 2017, now Pat. No. 10,445,406, which is a continuation of application No. 14/048,921, filed on Oct. 8, 2013, now Pat. No. 9,703,757.

(60) Provisional application No. 61/884,822, filed on Sep. 30, 2013.

(56) References Cited

U.S. PATENT DOCUMENTS

| | | | |
|---|---|---|---|
| 5,581,686 A | 12/1996 | Koppolu | |
| 5,608,727 A | 3/1997 | Perreault et al. | |
| 6,275,806 B1 | 8/2001 | Pertrushin | |
| 6,684,249 B1 | 1/2004 | Frerichs et al. | |
| 6,771,390 B1 | 8/2004 | Weidlich | |
| 6,857,007 B1 | 2/2005 | Bloomfield | |
| 7,003,729 B1 | 2/2006 | Rajala | |
| 7,219,309 B2 | 5/2007 | Kaasila | |
| 7,222,306 B2 | 5/2007 | Kaasila | |
| 7,337,392 B2 | 2/2008 | Lue | |
| 7,853,255 B2 | 12/2010 | Karaoguz et al. | |
| 7,865,404 B2 | 1/2011 | Peckover | |
| 7,877,696 B2 | 1/2011 | Telek | |
| 7,900,137 B2 | 3/2011 | Ivarsoy | |
| 7,925,138 B2 | 4/2011 | Ando | |
| 7,962,522 B2 | 6/2011 | Norris, III | |
| 7,964,841 B2 | 6/2011 | Imai | |
| 8,151,183 B2 | 4/2012 | Chen | |
| 8,195,133 B2 | 6/2012 | Ramer et al. | |
| 8,208,788 B2 | 6/2012 | Ando | |
| 8,265,220 B2 | 9/2012 | Komaili et al. | |
| 8,302,000 B2 | 10/2012 | Uehori | |
| 8,386,386 B1 | 2/2013 | Zhu | |
| 8,402,379 B2 | 3/2013 | Barak | |
| 8,413,070 B1 | 4/2013 | Castrucci | |
| 8,448,074 B2 | 5/2013 | Forutanpour | |
| 8,453,051 B1 | 5/2013 | Weiss | |
| 8,510,237 B2 | 8/2013 | Cascaval | |
| 8,756,523 B2 | 6/2014 | Chiba | |
| 8,903,716 B2 | 12/2014 | Chen et al. | |
| 8,914,753 B2 | 12/2014 | Miyata | |
| 8,938,672 B2 | 1/2015 | Desantis | |
| 9,014,483 B2 | 4/2015 | Ito | |
| 9,164,966 B1 | 10/2015 | Llach | |
| 9,183,319 B2 | 11/2015 | Joel | |
| 9,357,075 B1 | 5/2016 | Kloberdans et al. | |
| 9,542,956 B1 | 1/2017 | Nostrant | |
| 9,703,757 B2 | 7/2017 | Rimmer et al. | |
| 10,431,209 B2 | 10/2019 | Bhaya et al. | |
| 10,445,406 B1 | 10/2019 | Rimmer et al. | |
| 10,467,655 B1 | 11/2019 | Feldman et al. | |
| 10,614,153 B2 | 4/2020 | Rimmer et al. | |
| 10,630,751 B2 | 4/2020 | Bhaya et al. | |
| 11,120,194 B2 | 9/2021 | Rimmer et al. | |
| 2001/0016034 A1 | 8/2001 | Singh et al. | |
| 2002/0178005 A1 | 11/2002 | Dusan et al. | |
| 2003/0023656 A1 | 1/2003 | Hutchison et al. | |
| 2004/0056894 A1 | 3/2004 | Zaika | |
| 2004/0098251 A1 | 5/2004 | Vainio et al. | |
| 2004/0141016 A1 | 7/2004 | Fukatsu | |
| 2004/0177316 A1 | 9/2004 | Layzell | |
| 2005/0055636 A1* | 3/2005 | Graves ............... | G06F 16/957 707/E17.031 |
| 2005/0060709 A1 | 3/2005 | Kanai et al. | |
| 2005/0086345 A1 | 4/2005 | Philyaw et al. | |
| 2005/0096979 A1 | 5/2005 | Koningstein | |
| 2006/0103667 A1 | 5/2006 | Amit | |
| 2006/0242017 A1 | 10/2006 | Libes et al. | |
| 2006/0253796 A1 | 11/2006 | Wang | |
| 2007/0005433 A1 | 1/2007 | Lee et al. | |
| 2007/0019549 A1 | 1/2007 | Okabe | |
| 2007/0097975 A1 | 5/2007 | Rakers et al. | |
| 2007/0118797 A1 | 5/2007 | Layzell | |
| 2007/0127688 A1 | 6/2007 | Doulton | |
| 2008/0037656 A1 | 2/2008 | Hannuksela | |
| 2008/0114747 A1 | 5/2008 | Goller et al. | |
| 2008/0147388 A1 | 6/2008 | Singh | |
| 2008/0235574 A1 | 9/2008 | Telek et al. | |
| 2009/0085921 A1 | 4/2009 | Do et al. | |
| 2009/0132578 A1 | 5/2009 | Parikh | |
| 2009/0183065 A1 | 7/2009 | Endo et al. | |
| 2009/0234713 A1 | 9/2009 | Bi et al. | |
| 2009/0279108 A1 | 11/2009 | Hoshi | |
| 2009/0300120 A1 | 12/2009 | Schmidt | |
| 2009/0327032 A1 | 12/2009 | Gunawardana et al. | |
| 2010/0011316 A1 | 1/2010 | Sar | |
| 2010/0082780 A1 | 4/2010 | Muilenburg et al. | |
| 2010/0198694 A1 | 8/2010 | Muthukrishnan | |
| 2010/0199209 A1 | 8/2010 | Sueoka | |
| 2010/0199210 A1 | 8/2010 | Harada | |
| 2010/0199211 A1 | 8/2010 | Igawa | |
| 2010/0325430 A1 | 12/2010 | Denninghoff | |
| 2011/0093605 A1 | 4/2011 | Choudhury et al. | |
| 2011/0258562 A1 | 10/2011 | Zhu | |
| 2012/0060111 A1 | 3/2012 | Kim | |
| 2012/0123856 A1 | 5/2012 | Paunikar et al. | |
| 2012/0150667 A1 | 6/2012 | Salari | |
| 2012/0158490 A1 | 6/2012 | Neumeyer et al. | |
| 2012/0159314 A1 | 6/2012 | Schrier et al. | |
| 2012/0165009 A1 | 6/2012 | Oba et al. | |
| 2012/0265528 A1 | 10/2012 | Gruber et al. | |
| 2013/0007602 A1 | 1/2013 | Dougherty et al. | |
| 2013/0021377 A1 | 1/2013 | Doll | |
| 2013/0024757 A1 | 1/2013 | Doll | |
| 2013/0089098 A1 | 4/2013 | Mital et al. | |
| 2013/0117022 A1 | 5/2013 | Chen et al. | |
| 2013/0174047 A1 | 7/2013 | Sivakumar | |
| 2013/0275164 A1 | 10/2013 | Gruber et al. | |
| 2013/0298085 A1 | 11/2013 | Kritt | |
| 2013/0304758 A1 | 11/2013 | Gruber et al. | |
| 2013/0305144 A1 | 11/2013 | Jackson | |
| 2013/0305145 A1 | 11/2013 | Jackson | |
| 2013/0325585 A1 | 12/2013 | Amit et al. | |
| 2014/0033228 A1 | 1/2014 | Lucash | |
| 2014/0108941 A1 | 4/2014 | Joel et al. | |
| 2014/0180796 A1 | 6/2014 | Sas | |
| 2014/0222436 A1 | 8/2014 | Binder et al. | |
| 2014/0258849 A1 | 9/2014 | Chung et al. | |
| 2014/0281918 A1 | 9/2014 | Wei | |
| 2014/0337127 A1 | 11/2014 | Morel et al. | |
| 2015/0019957 A1 | 1/2015 | Ying | |
| 2015/0066479 A1 | 3/2015 | Pasupalak et al. | |
| 2015/0088970 A1 | 3/2015 | Wei | |
| 2015/0095768 A1 | 4/2015 | Rimmer et al. | |
| 2015/0242908 A1 | 8/2015 | Kobyakov | |
| 2015/0350598 A1 | 12/2015 | Yang et al. | |
| 2015/0379670 A1 | 12/2015 | Koker et al. | |
| 2016/0092699 A1 | 3/2016 | Riva et al. | |
| 2016/0274864 A1 | 9/2016 | Zomet et al. | |
| 2016/0308981 A1 | 10/2016 | Cortes Gomez | |
| 2016/0357717 A1 | 12/2016 | Metz et al. | |
| 2017/0068423 A1 | 3/2017 | Napolitano et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0169817 A1 | 6/2017 | Vanblon et al. | |
| 2017/0250936 A1 | 8/2017 | Rosenberg et al. | |
| 2017/0300456 A1 | 10/2017 | Rimmer et al. | |
| 2017/0315962 A1 | 11/2017 | Kovar | |
| 2017/0358301 A1 | 12/2017 | Raitio et al. | |
| 2018/0012595 A1 | 1/2018 | Weingartner | |
| 2018/0190271 A1 | 7/2018 | Bhaya et al. | |
| 2018/0191798 A1 | 7/2018 | Zhu et al. | |

FOREIGN PATENT DOCUMENTS

| | | |
|---|---|---|
| CN | 105654950 A | 6/2016 |
| CN | 106033476 A | 10/2016 |
| EP | 1965564 A1 | 9/2008 |
| EP | 2814244 A1 | 12/2014 |

(56) References Cited

FOREIGN PATENT DOCUMENTS

| | | |
|---|---|---|
| JP | 2005-043959 A | 2/2005 |
| JP | 2006-146939 A | 6/2006 |
| JP | 2006-519435 A | 8/2006 |
| JP | 2009-512005 A | 3/2009 |
| JP | 2011-066623 A | 3/2011 |
| JP | 2012-073863 A | 4/2012 |
| JP | 2014-132464 A | 7/2014 |
| JP | 2014-531076 A | 11/2014 |
| KR | 10-1029786 B1 | 4/2011 |
| KR | 10-1045589 B1 | 7/2011 |
| KR | 20140143768 A | 12/2014 |
| WO | WO-2004/084109 A1 | 9/2004 |
| WO | WO-2011/065564 A1 | 6/2011 |
| WO | WO-2011/088053 A2 | 7/2011 |
| WO | WO-2012/002351 A1 | 1/2012 |
| WO | WO-2014/014745 A2 | 1/2014 |
| WO | WO-2015/179510 A1 | 11/2015 |
| WO | WO-2016/054230 A1 | 4/2016 |
| WO | WO-2016/111881 A1 | 7/2016 |

OTHER PUBLICATIONS

International Patent No. PCT/US2014/057247, International Search Report and Written Opinion dated Dec. 30, 2014, 17 pages.
International Preliminary Report on Patentability on PCT/US2014/057247 dated Apr. 14, 2016.
Examination Report for AU Appln. Ser. No. 2017386098 dated Mar. 3, 2020 (3 pages).
Office Action for KR Appln. Ser. No. 10-2019-7032040 dated Mar. 30, 2020 (9 pages).
Corrected Notice of Allowance for U.S. Appl. No. 16/818,736 dated Oct. 6, 2020 (4 pages).
Examination Report for IN Appln. Ser. No. 201747039648 dated Sep. 21, 2020 (5 pages).
First Office Action for CN Appln. Ser. No. 201780001636.X dated Sep. 8, 2020 (10 pages).
Notice of Allowance for U.S. Appl. No. 16/818,736 dated Oct. 2, 2020 (20 pages).
Notice of Allowance for U.S. Appl. No. 15/590,861 dated Jul. 16, 2020 (5 pages).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", reprinted from https://www.amazon.com/gp/product/B0186JAEWK?ref%5F=cm%5Fsw%5Fr%5Ffa-%5Fdp%5Ft2%5FC5oazbJTKCB18&pldnSite=1 on Aug. 22, 2017 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition Within Messages", May 11, 2017 (11 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg, Jul. 5, 2017 (3 pages).
Close, Kerry, "Amazon Echo Will Give You These Deals If You Order Through Alexa This Weekend," Time.com, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", cnet, Apr. 26, 2017, reprinted from https://www.cnet.com/news/twitter-q1-2017-earnings/ on Aug. 22, 2017 (3 pages).
Cook, John, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, Adam Clark, "Amazon's Newest Gadget is a Tablet That's Also an Echo", Gizmodo, Sep. 19, 2017 (3 pages).
European Search Report on EP Appln. Ser. No. 14849752, dated Jun. 4, 2017 (8 pages).
Fiegerman, Seth, "Alexa, shut up: Raging Against the New Machines", CNN, Aug. 22, 2017 (6 pages).
Final Office Action for U.S. Appl. No. 15/361,668 dated Jan. 4, 2018 (7 pages).
Final Office Action for U.S. Appl. No. 15/395,725 dated Jun. 28, 2019 (27 pages).
Final Office Action on U.S. Appl. No. 14/048,921 dated Jul. 20, 2016 (21 pages).
Foghorn Labs, "10 Tips to Improve the Performance of Google Product Listing Ads," reprinted from: http://www.foghornlabs.com/2012/11/21/product-listing-ads-best-practices/-, on Mar. 18, 2013 (5 pages).
Foreign Search Report on EP Appln. Ser. No. 19187924.6 dated Sep. 3, 2019 (6 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", CNET, May 20, 2017 (6 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad is Trying to Control Your Google Home Device", HuffPost, Apr. 12, 2017 (7 pages).
Google Developers Newsletter "Google Assistant SDK", Google Developers, developers.google.com, accessed on Jul. 12, 2017 (2 pages).
Google, Inc., "Products Feed Specification", Google Merchant Center Help, reprinted from: http://www.support.google.com/merchants/bin/answer.py?hl=en&answer=188494- #US, on Mar. 18, 2013 (6 pages).
Google, Inc., "Supported File Formats", Google Merchant Center Help, reprinted from: http://www.support.google.com/merchants/bin/answer.py?hl=en&answer=160567-, on Mar. 18, 2013 (1 page).
Gurman et al., "Apple is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability for PCT Appl. Ser. No. PCT/US2017/049766 dated Mar. 13, 2019 (7 pages).
International Preliminary Report on Patentability for PCT Appl. Ser. No. PCT/US2017/049780 dated Sep. 10, 2018 (7 pages).
International Preliminary Report on Patentability on PCT Appln. Ser. No. PCT/US2014/057247 dated Apr. 14, 2016 (10 pages).
International Search Report and Written Opinion for PCT Appl. Ser. No. PCT/US2017/049780 dated Nov. 28, 2017 (11 pages).
International Search Report and Written Opinion for PCT Appl. Ser. No. PCT/US2017/49766 dated Nov. 24, 2017 (11 pages).
International Search Report and Written Opinion on PCT Appln. Ser. No. PCT/US2014/057247 dated Dec. 30, 2014 (19 pages).
Johnson, Khari, "Amazon's Alexa Wants to Learn More About Your Feelings", VentureBeat, Dec. 22, 2017 (4 pages).
Johnston, Lisa, "Amazon Whirlwind: New Echo, Plus, Spot, Connect, Fire TV Take The Stage", Twice, Sep. 27, 2017 (10 pages).
JP Office Action for Appl. Ser. No. 2017-566911 dated Feb. 25, 2019 (7 pages).

(56) References Cited

OTHER PUBLICATIONS

Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (3 pages).
Koetsier, John, "This AI Can Recognize Anger, Awe, Desire, Fear, Hate, Grief, Love . . . By How You Touch Your Phone", Consumer Tech, Aug. 31, 2018 (4 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Lardinois, Frederic, "Google Launches New Ad Unit for Responsive Sites," Google AdSense, http://techcrunch.com/2013/07/31/google-launches-new-ad-unit-for-responsi- ve-sites/, dated Jul. 31, 2013 (3 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC, May 18, 2017 (11 pages).
Liberatore, Stacy, "Now Alexa knows when you're angry: Amazon's virtual assistant will analyse emotions in user's voices", DailyMail.com, Jun. 13, 2016 (33 pages).
Lund, Pamela, "Mastering Google Product Feeds and Product Listing Ads—Part 1", reprinted from: http://www.blueglass.com/blog/mastering-google-product-feeds-and-product-- listing-ads-part-1/#comments on Dec. 28, 2013 (17 pages).
Medeiros, J. "Virtual Assistants Can Detect Your Bad Mood and Do Something About It", Voice Summit Blog, Dec. 1, 2018 (7 pages).
Nieva, Richard, "Google Home and eBay can tell you how much that's worth", cnet, Mar. 8, 2017 (3 pages).
Non-Final Office Action for U.S. Appl. No. 15/395,694 dated Aug. 9, 2018 (8 pages).
Non-Final Office Action for U.S. Appl. No. 15/638,312 dated May 16, 2019 (6 pages).
Non-Final Office Action for U.S. Appl. No. 15/395,725 dated Nov. 16, 2018 (7 pages).
Non-Final Office Action for U.S. Appl. No. 15/621,806 dated Sep. 25, 2018 (25 pages).
Non-Final Office Action on U.S. Appl. No. 15/361,668 dated Aug. 23, 2017 (6 pages).
Non-Final Office Action on U.S. Appl. No. 14/048,921 dated Nov. 25, 2015 (22 pages).
Non-Final Office Action on U.S. Appl. No. 14/176,845 dated Apr. 2, 2015 (8 pages).
Non-Final Office Action on U.S. Appl. No. 14/870,725 dated May 12, 2016 (13 pages).
Non-Final Office Action on U.S. Appl. No. 15/361,668 dated Aug. 23, 2017 (5 pages).
Non-Final Office Action on U.S. Appl. No. 15/361,668 dated Sep. 22, 2017 (8 pages).
Non-Final Office Action on U.S. Appl. No. 15/590,861 dated Jul. 25, 2019 (14 pages).
Non-Final Office Action on U.S. Appl. No. 16/544,367 dated Oct. 31, 2019 (11 pages).
Notice of Allowance for JP Appl. Ser. No. 2017-556886 dated May 27, 2019 (6 pages).
Notice of Allowance for U.S. Appl. No. 15/361,668 dated Feb. 9, 2018 (7 pages).
Notice of Allowance for U.S. Appl. No. 15/361,668 dated Jun. 14, 2018 (5 pages).
Notice of Allowance for U.S. Appl. No. 15/361,668 dated May 7, 2018 (5 pages).
Notice of Allowance for U.S. Appl. No. 15/395,694 dated Dec. 10, 2018 (8 pages).
Notice of Allowance for U.S. Appl. No. 15/395,694 dated Jun. 18, 2019 (8 pages).
Notice of Allowance for U.S. Appl. No. 15/395,694 dated Mar. 20, 2019 (8 pages).
Notice of Allowance for U.S. Appl. No. 15/621,806 dated Jun. 4, 2019 (5 pages).
Notice of Allowance for U.S. Appl. No. 15/621,806 dated Mar. 21, 2019 (10 pages).
Notice of Allowance on CN Appln. Ser. No. 201480054057.8 dated Aug. 30, 2019 (4 pages).
Notice of Allowance on JP Appln. Ser. No. 2017-556911 dated Jun. 10, 2019 (3 pages).
Notice of Allowance on JP Appln. Ser. No. JP 2016-545216 dated Feb. 4, 2019 (3 pages).
Notice of Allowance on KR Appln. Ser. No. 10-2017-7031379 dated Jul. 31, 2019 (3 pages).
Notice of Allowance on KR Appln. Ser. No. 10-2017-7031385 dated Jun. 19, 2019 (3 pages).
Notice of Allowance on U.S. Appl. No. 13/222,380 dated Oct. 7, 2013 (9 pages).
Notice of Allowance on U.S. Appl. No. 14/048,921 dated Mar. 13, 2017 (9 pages).
Notice of Allowance on U.S. Appl. No. 14/176,845 dated Aug. 6, 2015 (8 pages).
Notice of Allowance on U.S. Appl. No. 14/870,725 dated Sep. 1, 2016 (7 pages).
Notice of Allowance on U.S. Appl. No. 15/395,725 dated Oct. 18, 2019 (14 pages).
Notice of Allowance on U.S. Appl. No. 15/621,806 dated Aug. 13, 2019 (2 pages).
Notice of Allowance on U.S. Appl. No. 15/621,806 dated Sep. 17, 2019 (2 pages).
Notice of Allowance on U.S. Appl. No. 15/638,312 dated Sep. 17, 2019 (8 pages).
Novet, et al., "Amazon is getting ready to bring Alexa to work", CNBC, Nov. 29, 2017 (4 pages).
Office Action for CN Appl. Ser. No. 201480054057.8 dated Aug. 30, 2018 (7 pages).
Office Action for CN Appl. Ser. No. 201480054057.8 dated Jan. 17, 2018 (41 pages).
Office Action for CN Appl. Ser. No. 201480054057.8 dated Mar. 5, 2019 (30 pages).
Office Action for JP Appl. Ser. No. 2016-545216 dated Aug. 13, 2018 (6 pages).
Office Action for JP Appl. Ser. No. 2017-556886 dated Feb. 8, 2019 (8 pages).
Office Action for KR Appl. Ser. No. 10-2017-7031379 dated Jan. 21, 2019 (7 pages).
Office Action for KR Appl. Ser. No. 10-2017-7031385 dated Feb. 21, 2019 (21 pages).
Office Action on U.S. Appl. No. 13/222,380 dated Apr. 3, 2013 (22 pages).
Office Action on U.S. Appl. No. 13/222,380 dated Aug. 16, 2013 (5 pages).
Palladino, "Garmin teamed up with Amazon to make a tiny Echo Dot for your car", ars Technica. Oct. 17, 2017 (2 pages).
Patently Apple, "Apple Patent Reveals a New Security Feature Coming to Siri", Apr. 4, 2017, reprinted from http://www.patentlyapple.com/patently-apple/2017/04/apple-patent-reveals-- a-new-security-feature-coming-to-siri.html (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new--feature-of-understanding-different-voices-in-the-home-surfaced-today.html (3 pages).
Perez, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (8 pages).

(56) References Cited

OTHER PUBLICATIONS

Porter, Jon, "Amazon Echo Show release date, price, news and features", Tech Radar, Jun. 26, 2017 (11 pages).
Pringle, "'I'm sorry to hear that': Why training Siri to be a therapist won't be easy", CBC News, Sep. 24, 2017 (3 pages).
Purcher, Jack, Today Google Home's Virtual Assistant can learn its Owner's voice for Security Reasons like Apple's Patent Pending Idea, Apr. 20, 2017 (4 pages).
Roberston, Katie, "Amazon Bets on an Empathetic Alexa", The New York Times, Mar. 3, 2019 (3 pages).
Sablich, Justin, "Planning a Trip With the Help of Google Home"; New York Times; dated May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (2 pages).
Stackoverflow, "Is it possible for a thread to deadlock itself", 2010, Stackoverflow, accessed from: www.stackoverflow.com/questions/3493441/is-it-possible-for-a-thread-to-de- adlock-itself (23 pages).
Stackoverflow, "What is deadlock", 2008, Stackoverflow, accessed from: www.stackoverflow.com/questions/34512/what-is-a-deadlock# (17 pages).
Unknown Author, "'Dolphin' attacks fool Amazon, Google voice assistants", BBC News, Sep. 7, 2017 (8 pages).
Willens, Max, "For publishers, Amazon Alexa holds promise but not much money (yet)", Digiday, Jul. 6, 2017 (5 pages).
Examination Report for IN Appln. Ser. No. 201747040055 dated Oct. 21, 2020 (6 pages).
Examination Report for IN Appln. Ser. No. 201647007182 dated Jul. 14, 2020 (7 pages).
Notice of Allowance for U.S. Appl. No. 15/590,861 dated Nov. 12, 2020 (5 pages).
Notice of Allowance for U.S. Appl. No. 16/818,736 dated Nov. 30, 2020 (3 pages).
Notice of Allowance for U.S. Appl. No. 16/818,736 dated Nov. 6, 2020 (3 pages).
Final Office Action on U.S. Appl. No. 15/590,861 dated Nov. 22, 2019 (14 pages).
Notice of Allowance for U.S. Appl. No. 15/638,312 dated Jan. 2, 2020 (8 pages).
First Office Action for CN Appln. Ser. No. 201780001629.X dated Jul. 14, 2020 (19 pages).
Notice of Reasons for Rejection for JP 2019-127639 dated Sep. 7, 2020 (6 pages).
Office Action for KR Appln. Ser. No. 10-2019-7026715 dated Aug. 2, 2020 (6 pages).
Simonite, Tom, "Dinner and a Movie? Amazon Alexa Makes It Easier to Do Both", WIRED, Jun. 5, 2019, retrieved Sep. 23, 2020 from URL: https://www.wired.com/story/dinner-movie-amazon-alexa-makes-easier-do-bot- h/ (5 pages).
Examination Report for EP Appln. Ser. No. 17771624.8 dated Jan. 21, 2020 (6 pages).
Notice of Allowance for U.S. Appl. No. 15/395,725 dated Jan. 21, 2020 (14 pages).
Notice of Allowance for U.S. Appl. No. 16/544,367 dated Jan. 29, 2020 (8 pages).
Non-Final Office Action for U.S. Appl. No. 15/590,861 dated Mar. 17, 2020 (6 pages).
Office Action for JP Appln. Ser. No. 2019-039721 dated Mar. 30, 2020 (4 pages).
Examination Report for EP Appln. Ser. No. 17771624.8 dated Apr. 6, 2021 (5 pages).
Second Office Action for CN Appln. Ser. No. 201780001636.X dated Jan. 25, 2021 (6 pages).
Machine translation of JP 2012-073863, J-PlatPat, Apr. 12, 2012 (22 pages).
Non-Final Office Action for U.S. Appl. No. 16/696,558 dated Mar. 31, 2021 (9 pages).
Non-Final Office Action for U.S. Appl. No. 16/816,077 dated Apr. 1, 2021 (9 pages).
Office Action for KR Appln. Ser. No. 10-2021-7003319 dated Mar. 12, 2021 (13 pages).
Office Action for KR Appln. Ser. No. 10-2016-7009406 dated Dec. 15, 2020 (6 pages).
Office Action for KR Appln. Ser. No. 10-2021-7002298 dated Apr. 16, 2021 (9 pages).
Notice of Allowance for U.S. Appl. No. 16/696,558 dated Jun. 25, 2021 (7 pages).
Notice of Allowance for U.S. Appl. No. 16/815,077 dated Jul. 2, 2021 (8 pages).
"Walmart and Google to offer voice-enabled shopping", BBC News, Aug. 23, 2017.
Chen, Yilun Lulu, "Alibaba Challenges Google, Amazon With New Echo-Like Device", Bloomberg, Jul. 5, 2017 (3 pages).
Close, "Amazon Echo Will Give You These Deals If You Order Through Alexa This Weekend," Web Article, Nov. 18, 2016, Time.com (2 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
European Search Report on EP 14849752, dated Jun. 4, 2017, 8 pages.
Google Developers Newsletter "Google Assistant SDK", developers.google.com, retrieved on Jul. 12, 2017, 2 pages.
Gurma, Mark and Webb, Alex, "Apple is Manufacturing a Siri Speaker to Outdo Google and Amazon", Bloomberg, May 31, 2017, 3 pages.
International Preliminary Report on Patentability on PCT/US2014/057247 dated Apr. 14, 2016, 9 pgs.
Notice of Allowance on U.S. Appl. No. 13/222,380 dated Oct. 7, 2013.
Notice of Allowance on U.S. Appl. No. 14/176,845 dated Aug. 6, 2015.
Office Action on U.S. Appl. No. 13/222,380 dated Apr. 3, 2013.
Office Action on U.S. Appl. No. 13/222,380 dated Aug. 16, 2013.
Office Action on U.S. Appl. No. 14/176,845 dated Apr. 2, 2015.
Patently Apple, "Apple Patent Reveals a New Security Feature Coming to Siri", Apr. 4, 2017, reprinted from http://www.patentlyapple.com/patently-apple/2017/04/apple-patent-reveals-- a-new-security-feature-coming-to-siri.html, on Aug. 22, 2017 (6pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-- feature-of-understanding-different-voices-in-the-home-surfaced-today.html, on Aug. 22, 2017 (3 pages).
U.S. Notice of Allowance on U.S. Appl. No. 14/048,921 dated Mar. 13, 2017.
U.S. Notice of Allowance on U.S. Appl. No. 14/870,725 dated Sep. 1, 2016.
U.S. Office Action on U.S. Appl. No. 14/870,725 dated May 12, 2016.
U.S. Office Action on U.S. Appl. No. 14/048,921 dated Jul. 20, 2016.
U.S. Office Action on U.S. Appl. No. 14/048,921 dated Nov. 25, 2015.
U.S. Office Action on U.S. Appl. No. 15/361,668 dated Sep. 22, 2017.
U.S. Office Action on U.S. Appl. No. 15/361,668 dated Aug. 23, 2017.

(56) References Cited

OTHER PUBLICATIONS

U.S. Office Action on U.S. Appl. No. 15/361,668 dated Aug. 23, 2017, 6 pages.
Abrams, Help users find, interact & re-engage with your app on the Google Assistant, Google Developers Blog, Nov. 15, 2017 (16 pages).
Albrecht, "Alexa, How Can You Be Used in Restaurants?", The spoon, Dec. 10, 2017 (6 pages).
Barr, "AWS DeepLens—Get Hands-On Experience with Deep Learning With Our New Video Camera", AWS News Blog, Nov. 29, 2017 (11 pages).
CN Second Office Action dated Aug. 30, 2018 in Chinese Patent Application No. 201480054057.8 with English Translation.
Coberly, "Apple patent filing reveals potential whispering Siri functionality", Techspot, Dec. 14, 2017 (4 pages).
Estes, "Amazon's Newest Gadget is a Tablet That's Also an Echo", Gizmodo, Sep. 19, 2017 (3 pages).
Foghorn Labs, "10 Tips to Improve the Performance of Google Product Listing Ads," printed from Internet address: http://www.foghornlabs.com/2012/11/21/product-listing-ads-best-practices/-, on Mar. 18, 2013 (5 pages).
Google Inc., "Products Feed Specification," printed from Internet address: http://www.support.google.com/merchants/bin/answer.py?hl=en&answer=188494- #US, on Mar. 18, 2013 (6 pages).
Google Inc., "Supported File Formats," printed from Internet address: http://www.support.google.com/merchants/bin/answer.py?hl=en&answer=160567- , on Mar. 18, 2013 (1 page).
Heater, "Amazon Alexa devices can finally tell voices apart", TechCrunch, Oct. 11, 2017 (6 pages).
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017 (11 pages).
Krishna, "Jim Beam's smart decanter will pour you a shot when you ask", engadget, Nov. 29, 2017 (3 pages).
Lacy, "Improving search and advertising are the next frontiers for voice-activated devices", TechCrunch, Dec. 20, 2017 (13 pages).
Lee, Take Two for Samsung's troubled Bixby assistant, BBC News, Oct. 19, 2017 (6 pages).
Lund, Pamela, Mastering Google Product Feeds and Product Listing Ads $2013 Part 1, found at http://www.blueglass.com/blog/mastering-google-product-feeds-and-product-- listing-ads-part-1/#comments, Dec. 28, 2013 (17 pages).
Non-Final Office Action on U.S. Appl. No. 15/395,725 dated Nov. 16, 2018.
Notice of Allowance on U.S. Appl. No. 15/361,668 dated Jun. 14, 2018.
Notice of Allowance on U.S. Appl. No. 15/395,694 dated Dec. 10, 2018.
Notice of Reasons for Rejections for application No. 2016-545216 dated Aug. 13, 2018.
Notification of Transmittal of the International Preliminary Report on Patentability for application No. PCT/US2017/049780 dated Sep. 10, 2018.
Office Action for Chinese Appl. Ser. No. 201480054057.8 dated Jan. 17, 2018, 41 pages.
Stackoverflow "What is deadlock", 2008, Stackoverflow, http://stackoverflow.com/questions/34512/what-is-a-deadlock# (year:2008).
U.S. Notice of Allowance for U.S. Appl. No. 15,361,668 dated May 7, 2018.
U.S. Notice of Allowance for U.S. Appl. No. 15/361,668 dated Feb. 9, 2018.
U.S. Notice of Allowance on U.S. Appl. No. 15/361,668 dated May 7, 2018.
U.S. Office Action for U.S. Appl. No. 15/361,668 dated Jan. 4, 2018.
U.S. Office Action on U.S. Appl. No. 15/395,694 dated Aug. 9, 2018.
CN Third Office Action dated Mar. 5, 2019 in Chinese Patent Application No. 201480054057.8.
Fiegerman, Seth, "Alexa, shut up: Raging Against the New Machines", CNN, Aug. 22, 2017 (6 paqes).
JP First Office Action dated Feb. 25, 2019 in Japanese Patent Application No. 2017-556911.
JP Office Action dated Feb. 8, 2019 in Japanese Patent Application No. 2017-556886.
KR Office Action dated Feb. 21, 2019 in Korean Patent Application No. 10-2017-7031385.
KR Office Action dated Jan. 21, 2019 in Korean Patent Application No. 10-2017-7031379.
Notice of Allowance on U.S. Appl. No. 15/395,694 dated Mar. 20, 2019.
Robertson, Katie, "Amazon Bets on an Empathetic Alexa", The New York Times, Mar. 3, 2019 (3 pages).
Stackoverflow "Is it possible for a thread to deadlock itself", 2010, Stackoverflow, https://stackoverflow.com/questions/3493441/is-it-possible-for-a-thread-t- o-deadlock-itself (year:2010).
Non-Final Office Action on U.S. Appl. No. 15/638,312 dated May 16, 2019.
PCT International Prelim. Report on Patentability dated Mar. 13, 2019 in International Application No. PCT/US2017/049766.
Non-Final Office Action on U.S. Appl. No. 15/590,861 dated Jul. 25, 2019 (13 pages).
U.S. Notice of Allowance for U.S. Appl. No. 15/395,694 dated Jun. 18, 2019 (8 pages).
U.S. Office Action for U.S. Appl. No. 15/395,725 dated Jun. 28, 2019 (27 pages).

* cited by examiner

AUTOMATICALLY DETERMINING A SIZE FOR A CONTENT ITEM FOR A WEB PAGE

CROSS-REFERENCE TO RELATED PATENT APPLICATIONS

This is a continuation of U.S. patent application Ser. No. 17/475,334, filed Sep. 14, 2021, which is a continuation of U.S. patent application Ser. No. 16/586,271, filed Sep. 27, 2019, which is a continuation of U.S. patent application Ser. No. 15/621,806, filed Jun. 13, 2017, which is a continuation of U.S. patent application Ser. No. 14/048,921, filed Oct. 8, 2013, which application claims the benefit of U.S. Provisional Application No. 61/884,822, filed Sep. 30, 2013. The disclosure of each of the above-identified applications is hereby incorporated by reference herein in its entirety.

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a client device over the Internet. Additional third-party content can also be provided by third-party content providers for presentation on the client device together with the first-party content provided by the first-party content providers. Thus, a person viewing a resource can access the first-party content that is the subject of the resource, as well as the third-party content that may or may not be related to the subject matter of the resource.

SUMMARY

In one implementation, a method for selecting and serving a content item based on a determined content item size for a resource includes serving, using a processing module, a script to a client device in response to a request. The script is configured to determine a size of a viewport, determine a width of a parent element of a resource, and determine a content item size based, at least in part, on the size of the viewport and the width of the parent element. The method also includes receiving, at a processing module, information indicative of the determined content item size, determining, using a processing module, a set of content items based, at least in part, on the received information indicative of the determined content item size, selecting, using a processing module, a content item from the determined set of content items, and serving, using a processing module, data to effect display of the selected content item in the parent element with the resource.

In another implementation, a system for serving content items includes one or more processing modules and one or more storage devices. The one or more storage devices store instructions that, when executed by the one or more processing modules, cause the one or more processing modules to perform operations that include serving a script to a client device in response to a request. The script is configured to determine a size of a viewport, determine a width of a parent element of a resource, and determine a content item size based, at least in part, on the size of the viewport and the width of the parent element. The operations performed by the one or more processing modules further include receiving information indicative of the determined content item size, determining a set of content items based, at least in part, on the received information indicative of the determined content item size, selecting a content item from the determined set of content items, and serving data to effect display of the selected content item in the parent element with the resource.

Additional implementations, including implementations described below, are also within the scope of this disclosure.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
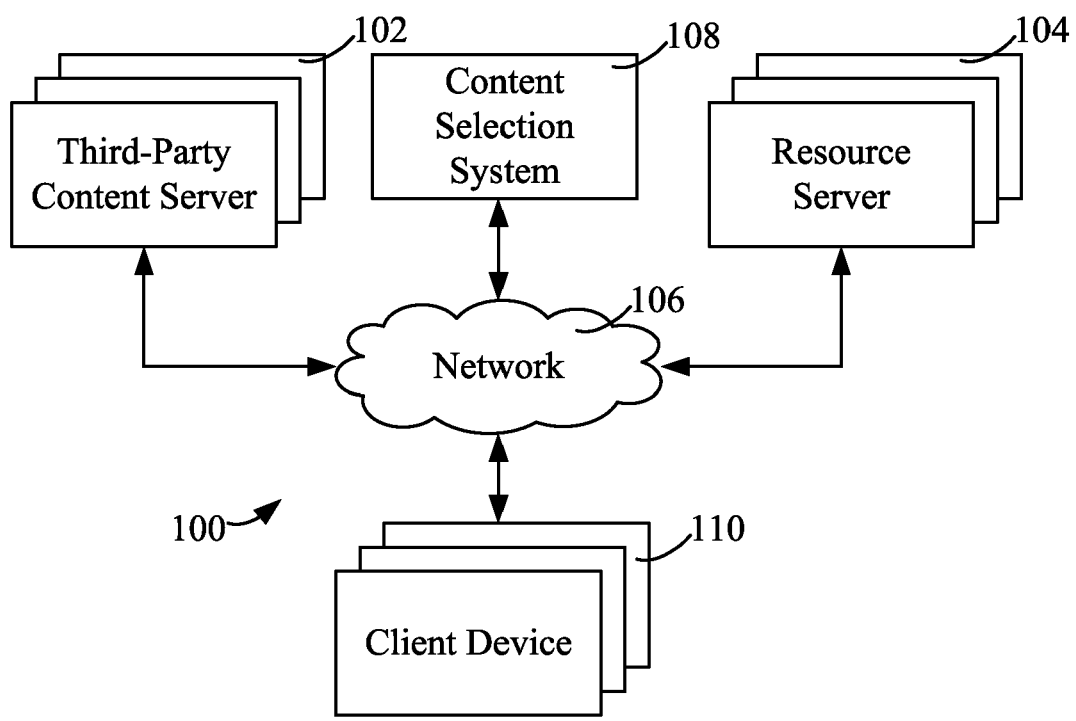
FIG. 1 is a block diagram depicting an implementation of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a client device) can view a resource, such as a web page, via the Internet by communicating with a server, such as a web page server, corresponding to that resource. The resource includes first-party content that is the subject of the resource from a first-party content provider, as well as additional third-party provided content, such as advertisements or other content. Website visitors use a wide range of devices with a wide range of screen sizes for viewing web pages. Accordingly, the presentation of the resource may be modified based on the type of device requesting the resource (e.g., a desktop computer, a tablet computer, a mobile device, etc.), a screen size of the device requesting the resource, and/or a viewable size of the first-party content on the client device. Such responsive web design enables the resource to be displayed in an aesthetically pleasing manner to an end user based on the client device and/or how the first-party content is being displayed on the client device. In some implementations, website owners manually decide what sizes of third-party content items they want for to be displayed with their web pages. That is, the presentation of third-party content items may be specified for the different types of devices requesting the resource, the different screen sizes, and/or the different viewable sizes of the first-party content such that the third-party content item does not dominate the viewable area of the device, yet is not overly small relative to the first-party content of the resource. For example, a large third-party content item that looks good and converts well on a large desktop screen may be too large on a mobile device. Conversely, a third-party content item that is of a small size, such as 320 pixels (px) by 50 pixels, designed to be presented on small displays of mobile devices may not be noticeable on a large desktop screen. Thus, it may be useful to automatically determine the size for a content item to be presented with the resource and to select and serve a third-party content item based on the determined size, as will be described in greater detail herein.

The selection and serving of the third-party content item may be in response to a request to access a web page from a web page server and/or a client device that communicates with a data processing system, such as a content item selection system, to request a content item to be presented with the requested web page. The content item selection system can select a third-party content item and provide data to effect presentation of the content item with the requested web page on a display of the client device. In some instances, the content item is selected and served with a resource associated with a search query. For example, a search engine may return search results on a search results web page and may include third-party content items related to the search query in one or more content item slots of the search results web page.

In some instances, a device identifier is associated with the client device. The device identifier may include a randomized number associated with the client device to identify the device during subsequent requests for resources and/or content items. In some instances, the device identifier is configured to store and/or cause the client device to transmit information related to the client device to the content item selection system and/or resource server (e.g., a web browser type, an operating system, prior resource requests, prior content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for display with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other implementations, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain web pages over others. Accordingly, auction bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots or units in which a selected and served third-party content item may be displayed. The code (e.g., JavaScript®), HTML, etc.) defining a content item slot for a web page or other resource may include instructions to request a third-party content item from the content item selection system to be displayed with the web page. Such code may be executed by the client device to perform other tasks prior to requesting the third-party content item. For example, the code may be configured to automatically determine the size for a content item to be presented with the resource based on a type of the client device, a screen size of the client device, a viewable size of the first-party content on the client device, and/or the size of a parent element to the content item slot or unit of the resource such that the request sent to the content item selection system results in an appropriately sized content item for the resource presented on the display of the client device. Such responsive content item slots or units provide first-party content providers with an easy solution and implementation for presenting third-party content items without having to manually define the sizes for content items for the various sizes that the first-party content may be displayed at.

While the foregoing has provided an overview of a content item selection system that can automatically determine a size for a content item, more specific implementations and methods for such a system will now be described.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a processing module, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The data processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C #, HTML, Java®, JavaScript®, Perl®, Python®, Visual Basic®, and XML. The processing module may process instructions and output data to effect presentation of one or more content items to the resource server 104 and/or the client device 110. In addition to the processing module, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C #, Java®, ActionScript®, JavaScript®, JSON, Perl®, HTML, HTML5, XML, Python®, and Visual Basic®.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate user interaction with the first-party content.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user (represented by a device identifier), which, when accessing a resource of the resource server 104, can make a request to the content item selection system 108 for one or more content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie which contains a device identifier (e.g., a random number) that represents the client device 110. In some implementations, the device and/or the resource information or parameters may be appended to a content item request URL (e.g., /page/contentitem?devid=abc123&devnfo=A34r0). In some implementations, the device and/or the resource information or parameters may be encoded prior to being appended the content item request URL. The requesting device and/or the resource information or parameters may be utilized by the content item selection system 108 to select third-party content items to be served with the requested resource and presented on a display of a client device 110. In some implementations, a height value and a width value may be included with the content item request such that the content item selection system 108 may use the height and width as part of the selection of a content item.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for client devices 110 having device identifiers associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 2A:
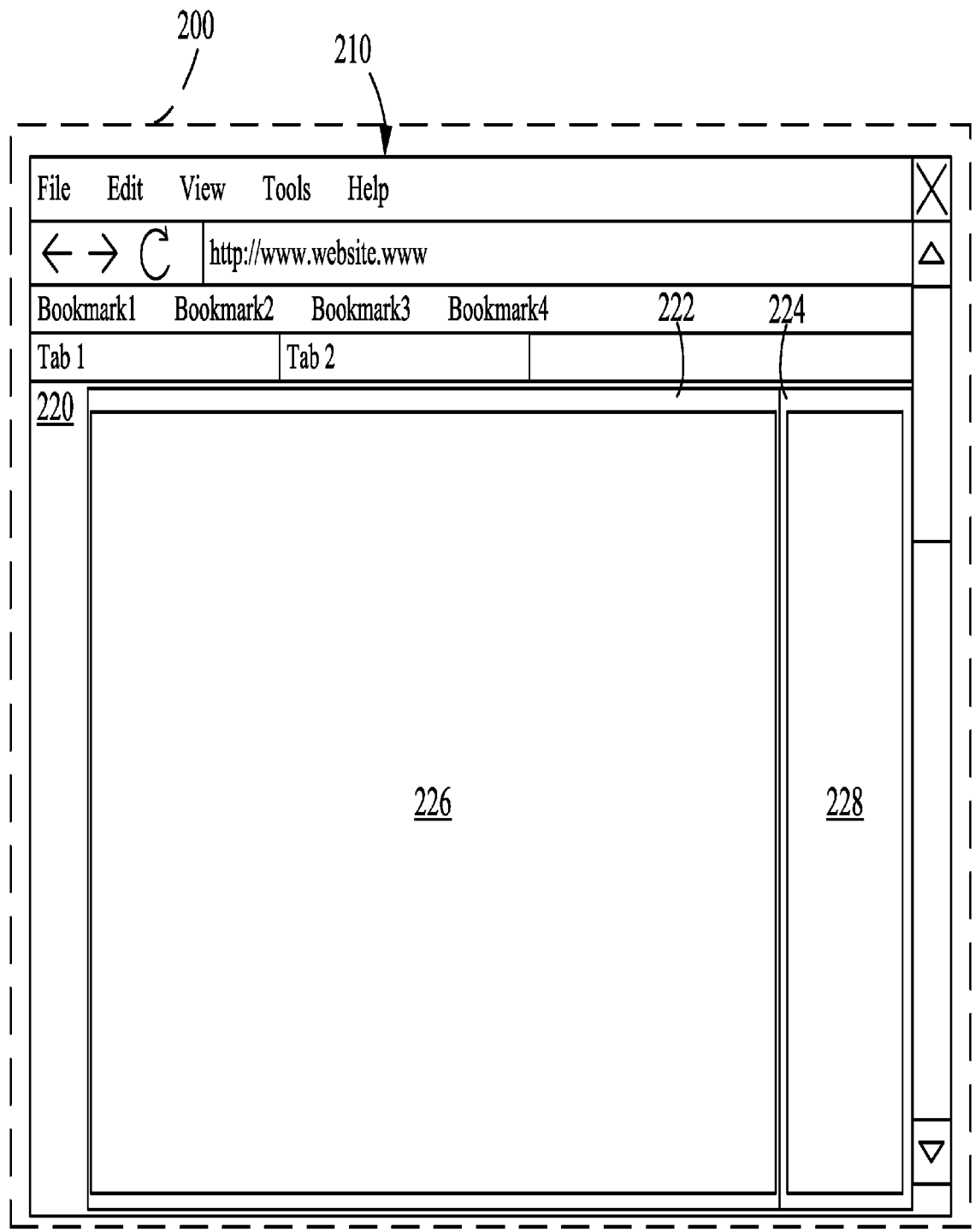
FIG. 2A is an illustration of an implementation of a first-party resource having third-party content shown in a window of a browser.

While the foregoing has provided an overview of a system 100 for selecting and serving content items to client devices 110, examples of content items served with resources will now be described in reference to FIGS. 2A-3B. FIG. 2A depicts an example display 200 (shown in phantom) of a client device, such as client device 110 of FIG. 1, with a web browser 210 for displaying resources on the display 200. The web browser 210 may operate by receiving input of a URL in an address bar, such as a web address, from an input device (e.g., a pointing device, a keyboard, a touch screen, or another form of input device). In response, one or more processing modules of a client device executing the instructions from the web browser 210 may request data from another device connected to a network, such as network 106, referred to by the URL address (e.g., a resource server 104). The other device may then provide data to effect presentation of the resource to the client device, which causes visual indicia to be displayed by the display 200 of the client device. Accordingly, the web browser 210 displays a retrieved resource 220, such as a webpage.

An example resource 220 is shown displayed by the display 200 of the client device using the web browser 210. The resource 220 includes a first content portion 222 and a second content portion 224. A first-party content provider may separate the first content portion 222 and the second content portion 224 via a div element. In some implementations, such as resources implementing responsive web design aspects, the first content portion 222 and the second content portion 224 may be defined based on a percentage of a viewport of the device on which the resource 220 is to be displayed. The viewport is the area that is visible within the browser 210 or other application when displaying the resource 220. The first content portion 222 and/or the second content portion 224 may include first-party content 226 of the first-party content provider, such as a news article, a social network interface, an application, etc. The resource 220 may also include code to request one or more third-party content items, such as third party content item 228, to be presented with the first-party content 226. In the implementation shown in FIG. 2A, a third-party content item 228 is shown served in the second content portion 224, such as through the use of content item selection system 108 of FIG. 1. The first-party content provider may include code to identify all or a portion of the second content portion 224 where the third-party content item 228 will be shown. For example, the first-party content provider may insert a piece of code, such as "ins class='contentitem'/ins" at each point where a third-party content item is to be presented. In other implementations, elements other than an insert element may be used, such as a div element, "div class='contentitem'/div." In addition, the cascading style sheet (CSS) class may have a label other than "contentitem." As will be described in greater detail below, an asynchronous tag may be included to request a script, such as JavaScript®), when the resource 220 is to be rendered on the client device. The script is configured to automatically determine a size for a content item to be presented with the resource 220 based on a type of the client device, a screen size of the client device, the viewport size, and/or the size of a parent element (e.g., second content portion 224) such that a request sent to the content item selection system results in an appropriately sized content item for the resource 220 presented on the display 200 of the client device.

Figure 2B:
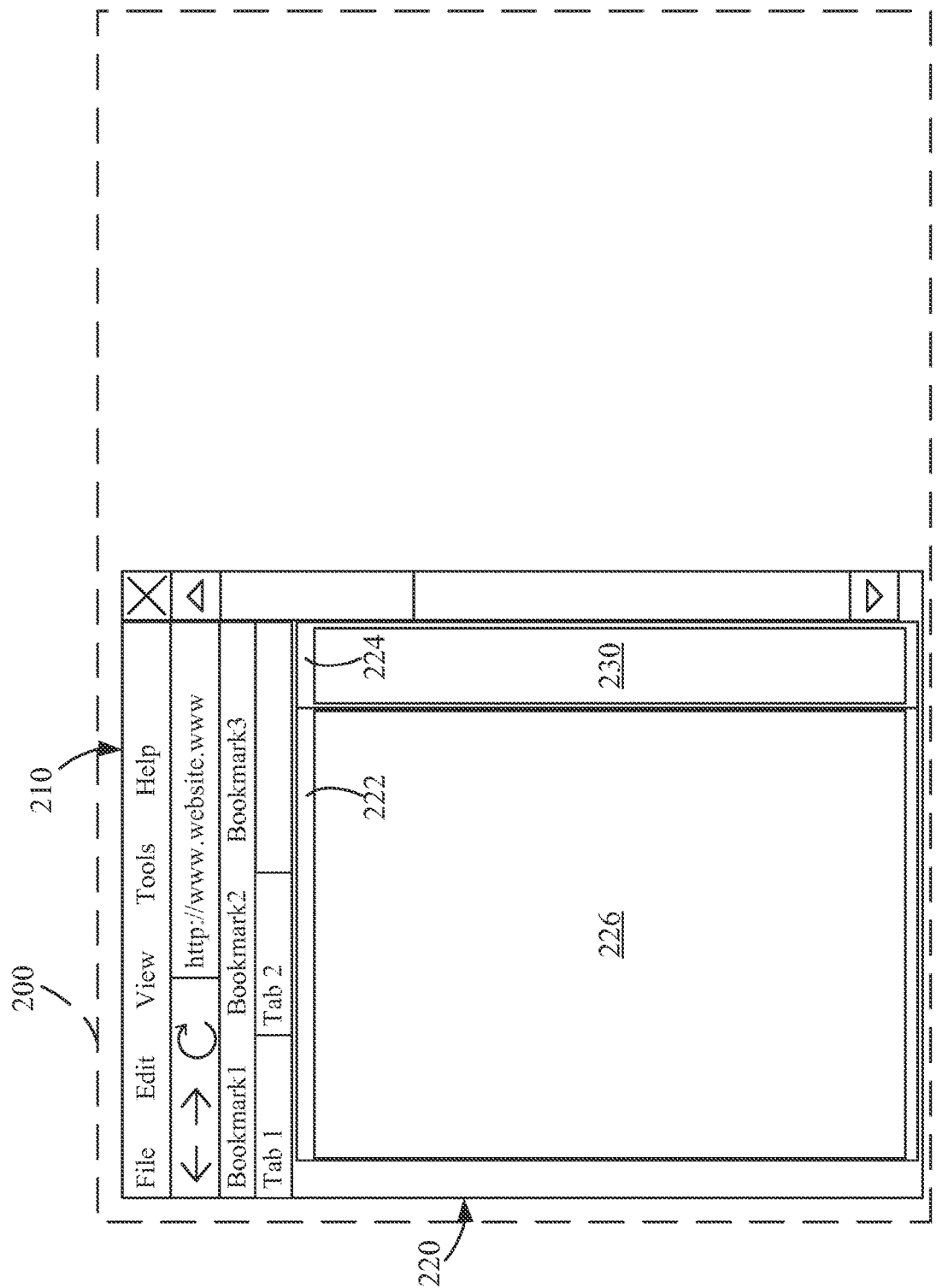
FIG. 2B is an illustration of the implementation of the first-party resource having third-party content of FIG. 2A shown with the window of the browser resized.

FIG. 2B depicts the display 200 of FIG. 2A showing the web browser 210 resized such that the resource 220 is also resized, such as through responsive web page design. The script may be configured to automatically determine a new size for the third-party content item based on the resizing of the resource 220. In some implementations, the new size for the third-party content item 228 may be the same such that the third-party content item 228 may simply remain presented. In instances where the new size is different, a third-party content item 230 of the corresponding new size may be requested from the content item selection system to be displayed with the resource 220 or the previously served third-party content item 228 may be resized at the client device without a request to the content item selection system (e.g., via scam-carving, stretching, etc.). In some implementations, the third-party content item 230 may be the same as third-party content item 228, only in a different size.

Figure 3A:
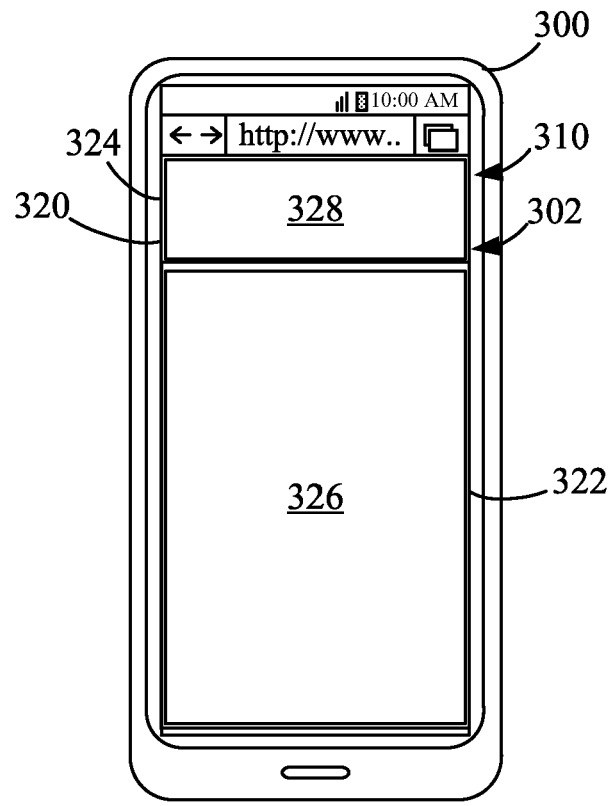
FIG. 3A is an illustration of an implementation of another first-party resource displayed on a mobile device and having third-party content.

FIG. 3A depicts a mobile client device 300, such as a smartphone or tablet, on which a resource 320 may be displayed by a display 302 of the client device 300. In the implementation show, a web browser 310 is executing on the module client device 300 for displaying resources 320 on the display 302. The web browser 310 may operate by receiving input of a URL in an address bar, such as a web address, from an input device (e.g., a pointing device, a keyboard, a touch screen, or another form of input device). In response, one or more processing modules of the client device 300 executing the instructions from the web browser 310 may request data from another device connected to a network, such as network 106, referred to by the URL address (e.g., a resource server 104). The other device may then provide data to effect presentation of the resource 320 to the client device 300, which causes visual indicia to be displayed by the display 302 of the client device 300. Accordingly, the web browser 310 displays a retrieved resource 320, such as a webpage.

An example resource 320 is shown displayed by the display 302 of the client device 300 using the web browser 310. The resource 320 includes a first content portion 322 and a second content portion 324. A first-party content provider may separate the first content portion 322 and the second content portion 324 via a div element. In some implementations, such as resources implementing responsive web design aspects, the first content portion 322 and the second content portion 324 may be defined based on a percentage of a viewport of the device 300 on which the resource 320 is to be displayed. The first content portion 322 and/or the second content portion 324 includes the first-party content 326 of the first-party content provider, such as a news article, a social network interface, an application, etc. The resource 320 may also include code to request one or more third-party content items, such as third-party content item 328, to be presented with the first-party content 326. In the implementation shown in FIG. 3A, a third-party content item 328 is shown served in the second content portion 324, such as through the use of content item selection system 108 of FIG. 1. The first-party content provider may include code to identify all or a portion of the second content portion 324 where the third-party content item 328 will be shown. For example, the first-party content provider may insert a piece of code, such as "ins class='contentitem'/ins" at each point where a third-party content item 328 is to be presented. In other implementations, elements other than an insert element may be used, such as a div element, "div class='contentitem'/div." In addition, the cascading style sheet (CSS) class may have a label other than "contentitem." As will be described in greater detail below, the class may include an asynchronous tag to request a script, such as JavaScript®), when the resource 320 is to be rendered on the client device 300. The script is configured to automatically determine the size for a content item to be presented with the resource 320 based on a type of the client device 300, a screen size of the client device 300, the viewport size, and/or the size of a parent element (e.g., second content portion 324) such that a request sent to the content item selection system results in an appropriately sized content item for the resource 320 presented on the display 302 of the client device 300.

Figure 3B:
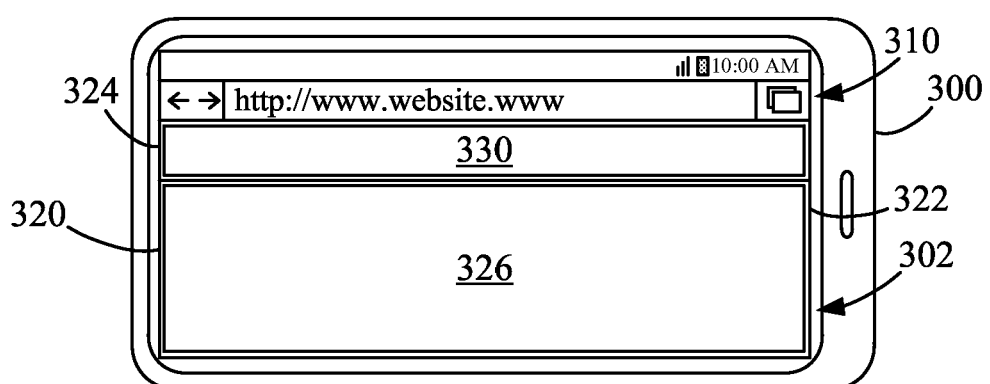
FIG. 3B is an illustration of the implementation of the first-party resource displayed on the mobile device of FIG. 3A shown displayed after the mobile device is rotated.

FIG. 3B depicts the device 300 of FIG. 3A rotated such that the resource 320 presented on the display 302 of the device 300 is rotated from a portrait orientation to a landscape orientation. In some instances, the orientation change for the resource 320 may result in the resource 320 being presented with a different configuration or sizing. The script may be configured to automatically determine a new size for the third-party content item based on the different configuration or sizing of the resource 320. In some implementations, the new size for the third-party content item 328 may be the same such that the third-party content item 328 may simply remain presented. In instances where the new size is different, a third-party content item 330 of the corresponding new size may be requested from the content item selection system to be displayed with the resource 320 or the previously served third-party content item 328 may be resized at the client device 300 without a request to the content item selection system (e.g., via seam-carving, stretching, etc.). In some implementations, the third-party content item 330 may be the same as third-party content item 328, only in a different size. As may be appreciated, the sizing for the third-party content item may be determined automatically such that the owner or creator of the resource 220, 320 may not need to determine the right size for a third-party content item for various sizes or configurations of the resource 220, 320.

The CSS classes described above, such as 'contentiem,' may include an asynchronous tag that requests a script. The asynchronous tag may be a tag, such as:
script async
src="/pagead/js/contentitem.js"/script
ins class="contentitem" data-ad-client="ca-pub-1234" data-ad-slot="my-slot"/ins
script(content item=window.content item ‖[ ]).push({ }); /script that is inserted into a portion of the resource where a third-party content item is to be displayed. In some implementations, the tag may be further configured to limit the geometric types of third-party content items that may be selected. For example, the tag may include a value or values for a variable that limits the geometric types of third-party content items that may be selected, such as a variable named "data-ad-format,". Such geometric types may include horizontal, vertical, rectangle, etc. Thus, including the variable of data-ad-format="horizontal, vertical" in the tag results in only horizontal and vertical content item sizes being eligible for selection for that tag. If data-ad-format is omitted, then any geometric type of content item may be selected.

When the script, such as contentitem.js, is received and executed by the client device, the script may be configured to locate all the portions of the resource where third-party content items will be served and a size determination is needed (e.g., where ins class='contentitem'/ins or div class='contentitem'/div are located), determine a size of a viewport, determine a width of a parent element for each portion where a third-party content item will be served, and determine a content item size for each portion where third-party content items will be served. In some implementations, the script may be triggered to be executed based on a DOMContentLoaded event such that there is enough information about the various sizes of the elements of the resource even if all the elements of the resource have not necessarily finished loading. Thus, the script can determine an appropriate size for the third-party content item for resources that are rendered differently based on the client device, such as web pages implementing responsive web page design. The determination of the content item size may be based, at least in part, on the size of the viewport and the width of a parent element of the resource, as will be described in greater detail herein. The script may be configured to query the document object model (DOM) to find the parent element of the where ins class='contentitem'/ins or div class='contentitem'/div is located and query the DOM for the width of the parent element. In some implementations, the height of the parent element may also be used in the determination of the content item size.

The content item size determination may include selecting a predetermine standard size, such as a standard size specified by the Interactive Advertising Bureau (IAB). Such standard sizes may include 320 px by 50 px, 234 px by 60 px, 468 px by 60 px, 728 px by 90 px, 970 px by 90 px, 125 px by 125 px, 180 px by 150 px, 200 px by 200 px, 250 px by 250 px, 300 px by 250 px, 336 px by 280 px, 120 px by 600 px, 160 px by 600 px, 300 px by 600 px, and/or any other standard content item size. As will be described in greater detail herein, the set of standard sizes may be ranked and the highest ranked standard size may be selected.

In some implementations, the set of standard sizes that may be eligible for ranking may be subject to additional limitations. For example, a standard size may not be ranked if the area of the standard size exceeds a threshold value for a predetermined percentage of a viewport area. The threshold value may be a value between 10%, inclusive, to 50%, inclusive. In one implementation the threshold value may be 15%. In other implementations, the first-party content provider may specify the threshold value. Other limitations to the inclusion of a standard content item size in the ranking may be whether the width of the standard content item size exceeds a width of the viewport, whether the height of the standard content item size exceeds a height of the viewport, and/or whether the standard content item size is an excluded geometric type based on the value or values of the variable of data-ad-format.

Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

$$Rating = Area * eRPM * ratio\_match$$

In some implementations, each multiplier in the foregoing equation may be weighted. The area of each predetermined standard content item size may be the pixel area of the predetermined standard content item size, such as 320 px by 50 px, which has an area of 16,000 pixels. The estimated revenue value for a predetermined standard content item size (i.e., estimated revenue per thousand impressions or eRPM in the equation above) may be a value determined for each predetermined standard content item size based on global data for that particular predetermined standard content item size. That is, a list of static values for each standard content item size may be used based on historical data. In other implementations, the estimated revenue value for a predetermined standard content item size may a value that is publisher-specific, website specific, webpage specific, and/or location-specific.

The ratio match value provides a measure of how well suited the predetermined standard content item size is for the portion of the resource where a third-party content item will be served. The ratio match value may be based on a width of a parent element and a width of the viewport. In brief, vertical standard content item sizes may be preferable to be displayed in narrow columnar portions of the displayed resource, horizontal standard content item sizes may be preferable to be displayed in wide portions of the displayed resource, and rectangular standard content item sizes may be preferable to be displayed in the remaining portions of the displayed resource. In an implementation, an if-then statement may be used to sort standard content item sizes based on the ratio match value. For example:
if width of parent element <=25% of width of body:
  favor vertical, then square, then horizontal
else if width of parent element <=50% of width of body:
  favor square then horizontal then vertical
else:
  favor horizontal then square then vertical.

Figure 4:
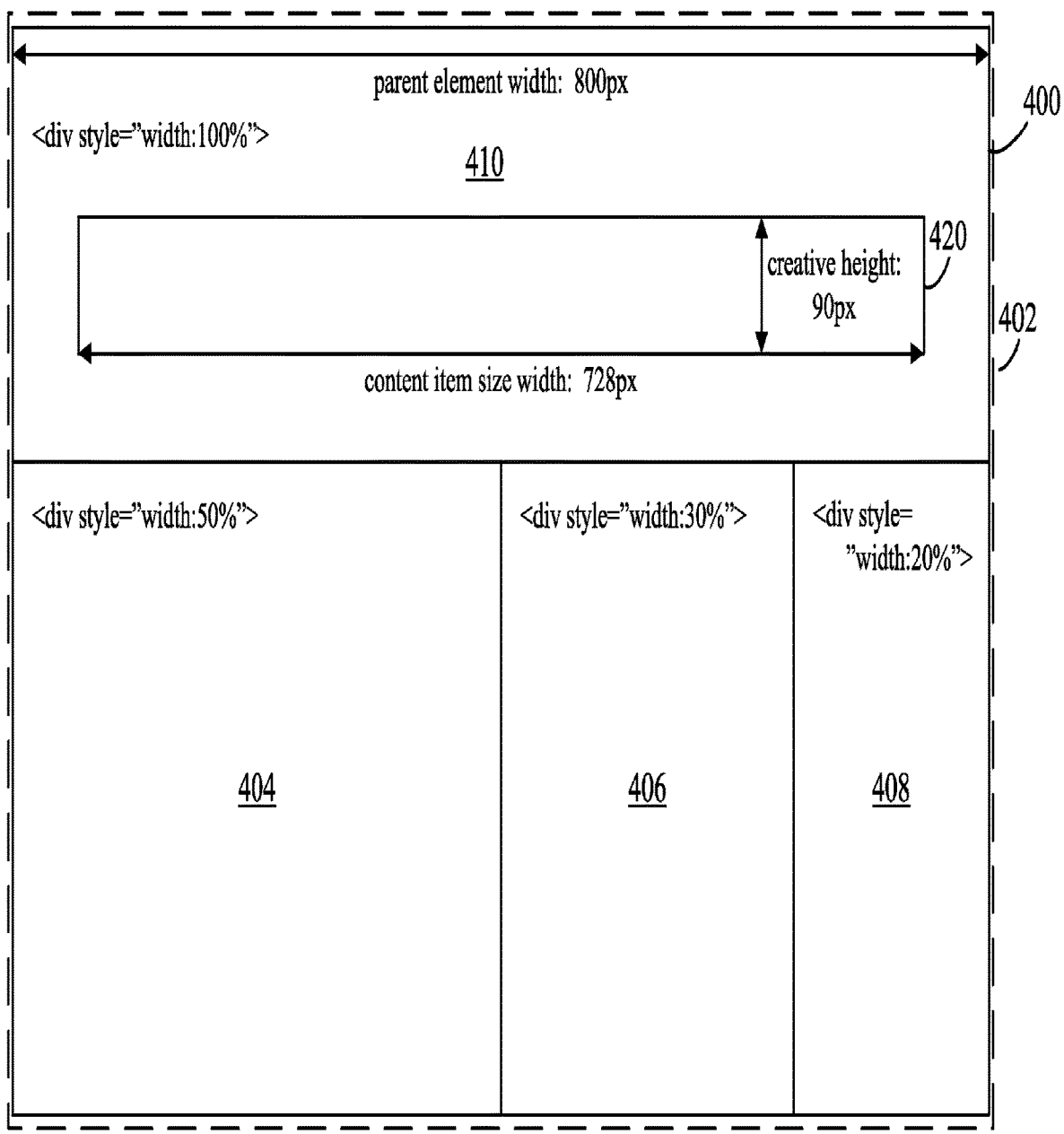
FIG. 4 is an illustration of an implementation of a first-party resource having multiple divisions and showing an example third-party content item in a parent element.

Another implementation may determine a value for the ratio match value based on a percentage of a width of a parent element that the standard content item size would occupy. For example, FIG. 4 is an illustration of an implementation of a first-party resource 400 shown in a viewport 402. The resource 400 includes multiple divisions of elements 404, 406, 408, 410 and showing an example third-party content item 420 having a standard content item size of 728 pixels by 90 pixels in a parent element 410. The parent element 410 has a width of 800 pixels and spans across the entire width of the viewport 402. For a set of standard content item sizes, such as those enumerated above, the standard content item size that does not exceed the width of the parent element 410 and occupies the highest percentage of the width of the parent element 410 is the standard content item size of 728 pixels by 90 pixels; an example third-party content item 420 of this size is shown within the parent element 410. Thus, the ratio match value for the standard content item size of 728 px by 90 px may be determined to be 728 divided by 800, or 0.91 or 91%. The ratio match value may be used in the rating equation described above to determine a rating for the standard content item size such that a standard content item size with the best rating may be determined and selected. The other standard content item sizes may also have ratio match values determined in a similar manner.

Figure 5A:
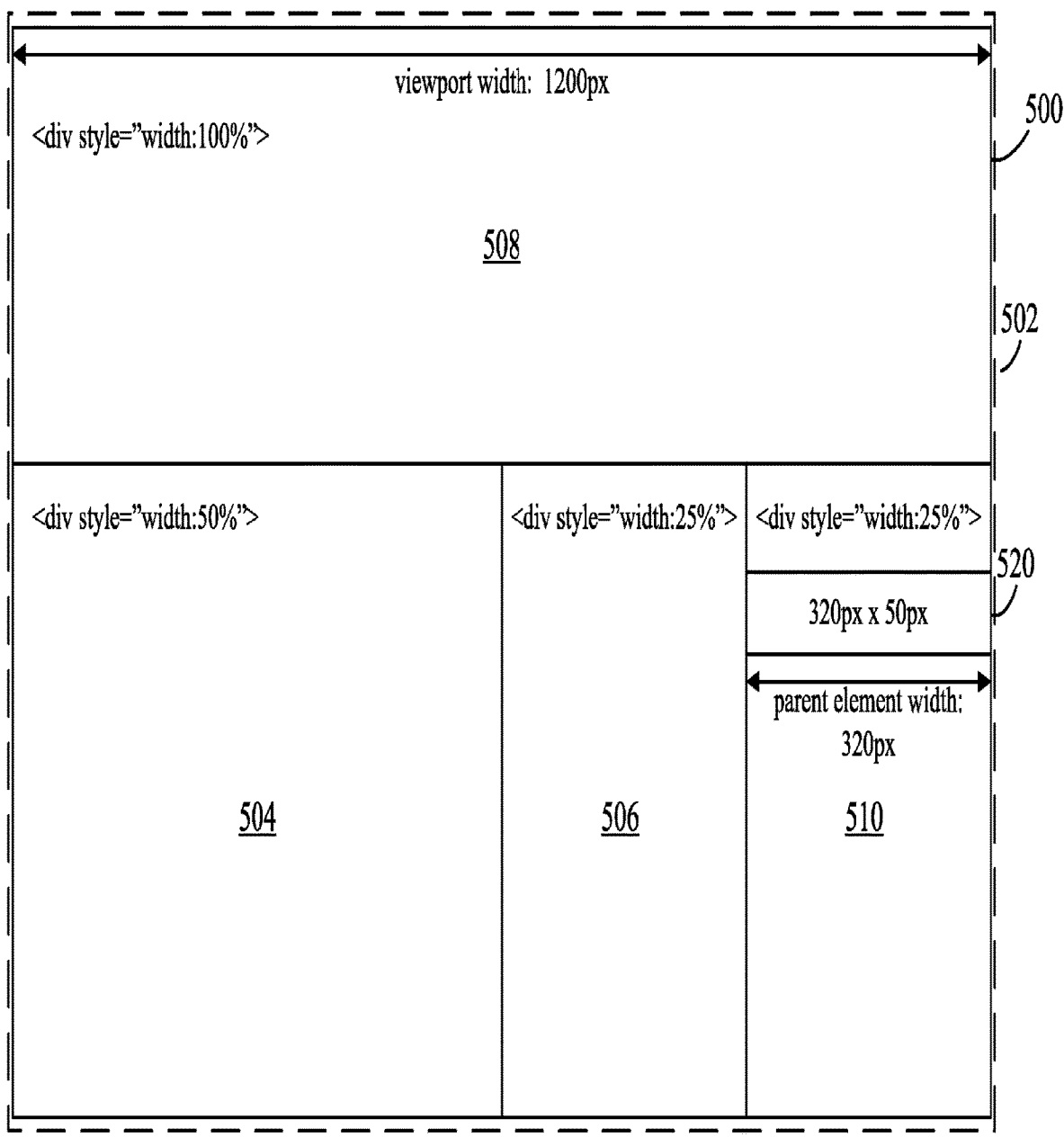
FIG. 5A is an illustration of an implementation of a first-party resource having multiple divisions and showing an example third-party content item in a parent element.
Figure 5B:
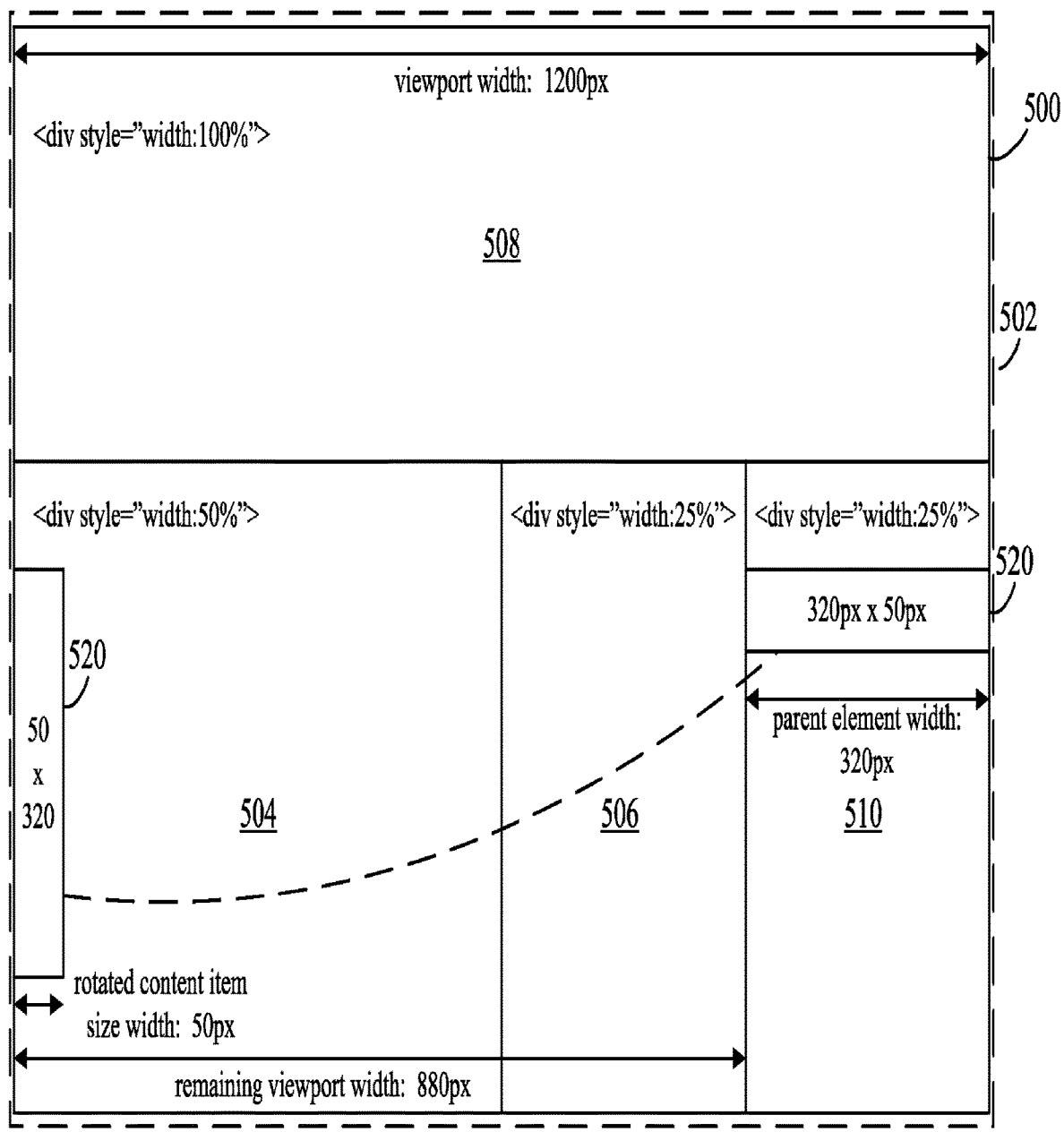
FIG. 5B is an illustration of the first-party resource of FIG. 5A showing the example third-party content item rotated relative to the first-party resource.

Another implementation may determine the ratio match value based on a percentage of a width of a parent element that the standard content item size would occupy and a percentage of a remaining portion of a viewport width that a height dimension of the standard content item size would occupy. FIG. 5A is an illustration of an implementation of a first-party resource 500 shown in a viewport 502. The resource 500 includes multiple divisions of elements 504, 506, 508, 510 and showing an example third-party content item 520 having a standard content item size of 320 pixels by 50 pixels in a parent element 510. The parent element 510 has a width of 320 pixels and spans 25% of the width of the viewport 502. For the standard content item size of the content item 520, the percentage of the width of the parent element 510 that the standard content item size occupies is 100% (i.e., 320 px divided by 320 px is one). However, as shown in FIGS. 5A-5B, the standard content item size of 320 pixels by 50 pixels occupies very little vertical space of the parent element 510. Accordingly, a second percentage may be calculated based on a remaining portion of the viewport 502 width (i.e., after subtracting the width of the parent element 510 from the total width of the viewport 502) and a height dimension of the standard content item size, shown in FIG. 5B. The width of the remaining portion of the viewport 502 in the example shown is 880 pixels (1200 pixels minus 320 pixels). The percentage of the height dimension of the standard content item size relative to the width of the remaining portion of the viewport 502 is 50 divided by 880, or approximately 6%. Thus, the ratio match value for the standard content item size of 320 pixels by 50 pixels for the parent element 510 may be the first percentage, 100% or 1.0, multiplied by the second percentage, 6% or 0.06, resulting in a ratio match value of 0.06.

In contrast, for a standard content item size of 300 pixels by 600 pixels for a third-party content item to be displayed in the parent element 510, the first percentage is approximately 94% (300 pixel width for the standard content item size divided by 320 pixel width for the parent element 510) and the second percentage is approximately 68% (600 pixel height for the standard content item size divided by 880 pixel width of the remaining portion of the viewport 502). Accordingly, the ratio match value for the standard content item size of 300 pixels by 600 pixels may be 0.94 multiplied by 0.68, or approximately 0.64. As may be appreciated, the standard content item size of 300 pixels by 600 pixels has a greater ratio match value than the standard content item size of 320 pixels by 50 pixels, which indicates that the standard content item size of 300 pixels by 600 pixels is likely to be better suited for portion of the resource where a third-party content item will be served.

In some implementations, a multiplier may be used with the second percentage of the ratio match value. For example, for a vertical standard content item size, such as 120 px by 600 px, 160 px by 600 px, or 300 px by 600 px, a multiplier for the second percentage may be zero since the vertical format may be out of proportion relative to the rest of the resource. The multiplier for horizontal or rectangular standard content item sizes, such as 320 px by 50 px, 234 px by 60 px, 468 px by 60 px, 728 px by 90 px, 970 px by 90 px, 125 px by 125 px, 180 px by 150 px, 200 px by 200 px, 250 px by 250 px, 300 px by 250 px, or 336 px by 280 px, may be between 1, inclusive, and 2, inclusive. In some implementations, the multiplier for horizontal standard content item sizes, such as 320 px by 50 px, 234 px by 60 px, 468 px by 60 px, 728 px by 90 px, or 970 px by 90 px, may be 1 and the multiplier for rectangular standard content item sizes, such as 125 px by 125 px, 180 px by 150 px, 200 px by 200 px, 250 px by 250 px, 300 px by 250 px, or 336 px by 280 px, may be 1.5.

Once each eligible standard content item size of the set of standard content item sizes is ranked, then the top ranked standard content item size may be determined. The height value of the determined standard content item size and the width of the parent element are sent to the content item selection system, such as part of a content item request. In the implementation shown in FIG. 4, the height value is set to 90 pixels, which is the height of the determined standard content item size, and the width value is set to 800 pixels, which is the width of the parent element 410. The full width of the parent element 410 is sent such that, if a textual third-party content item is selected by the content item selection system, then the full width of the parent element 410 may be used for displaying the textual content item. If an image third-party content item is selected by the content item selection system then the standard content item size may be used. Data to effect display of the selected content item may be transmitted to the client device such that the selected content item is displayed with the resource.

In some implementations, further limits may be applied during the selection of content item sizes. For example, a total limit threshold value may be used such that the total area of all the content item sizes does not exceed a predetermined percentage of the viewport area or a total limit threshold value may be used such that the total area of the content item sizes above the fold do not exceed a predetermined percentage of the viewport area.

Figure 6:
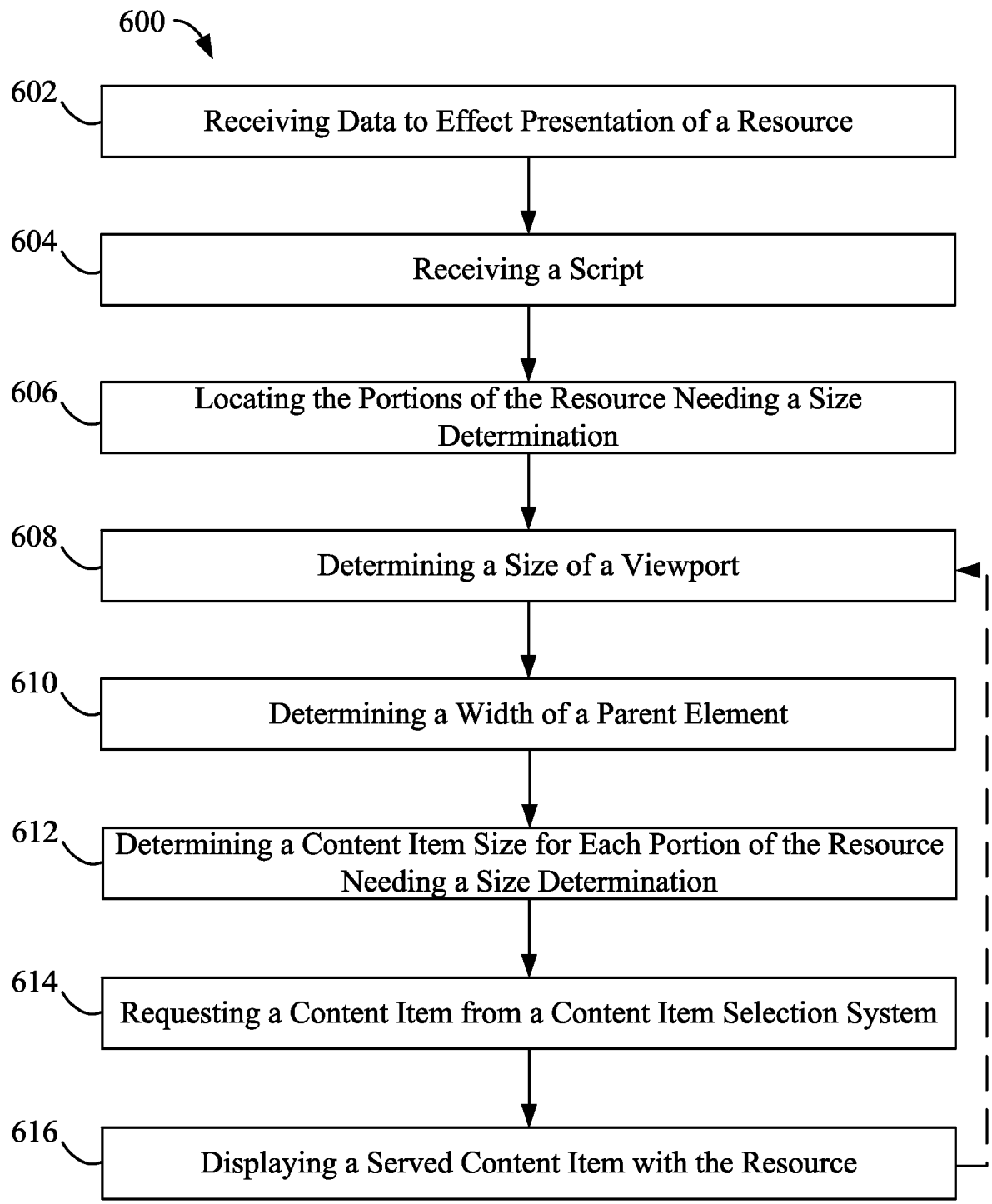
FIG. 6 is a flow diagram of an implementation of a process to automatically determine a size for a content item based on a parent element of the content item slot.

FIG. 6 depicts an example flow diagram of a process 600 that may be implemented by a client device, such as client device 110 of FIG. 1, to automatically determine a size for a content item based on a parent element. The process 600 includes receiving data to effect presentation of a requested resource (block 602). The client device may request the data to effect presentation of a resource via a user entering a URL into an address portion of a web browser. A resource server, such as resource server 104 of FIG. 1, sends the data to effect presentation of the resource to the client device via network 106.

The process 600 further includes receiving a script (block 604). In some implementations the script may be requested and received from another device, such as the content item selection system 108 of FIG. 1 or another device. In some other implementations, the script may be cached on the client device and retrieved and executed.

The script is configured to cause the client device to locate the portions of the resource where third-party content items will be served and a size determination is needed (block 606). The locating of the portions of the resource where third-party content items will be served and a size determination is needed may include identifying the portions of the resource having an insert element for "ins class='contentitem'/ins". In other implementations, other identifiers to indicate the locations in the resource where third-party content items will be served and a size determination is needed may be used, such as "div class='contentitem'/div".

The script is further configured to cause the client device to determine a size of a viewport (block 608). In some implementations, the determination of the size of the viewport may include retrieving the values for body offsetWidth and body offsetHeight for the width and height of the body of the resource. The script is further configured to cause the client device to determine a width of a parent element for each portion where a third-party content item will be served (block 610). For example, the determination of the parent element width may be determined based on the viewport width, a parent element of the parent element, a static value for the parent element width, etc. In some implementations, the script may be configured to query the DOM to find the parent element of the where ins class='contentitem'/ins or div class='contentitem'/div is located and query the DOM for the width of the parent element. The height of the parent element may also be queried and used in the determination of the content item size.

The script is further configured to cause the client device to determine a content item size for each portion where third-party content items will be served (block 612). The determination of the content item size may be based, at least in part, on the size of the viewport and the width of a parent element of the resource, as described in greater detail herein. In some implementations, the height of the parent element may also be used in the determination of the content item size. The content item size determination may include selecting a predetermine standard content item size based on a ranking of each predetermined standard content item size. As noted above, the set of standard sizes that may be eligible for ranking may be subject to additional limitations in some implementations. For example, a predetermined standard content item size may not be ranked if the standard size exceeds a threshold value for a predetermined percentage of a viewport area, such as a threshold value of 15% of the area of the viewport. A predetermined standard content item size may also not be ranked if the width of the standard size exceeds the width of the parent element and/or the height of the standard size exceeds the height of the parent element. Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

$$Rating = Area * eRPM * ratio\_match$$

In some implementations, each multiplier in the equation may be weighted. The area of each predetermined standard content item size may be the pixel area of the predetermined standard content item size. The estimated revenue value for a predetermined standard content item size (i.e., estimated revenue per thousand impressions or eRPM in the equation above) may be a value determined for each predetermined standard content item size based on global data for that particular predetermined standard content item size. In other implementations, the estimated revenue value for a predetermined standard content item size may a value that is publisher-specific, website specific, webpage specific, and/or location-specific.

The ratio match value may be based, at least in part, on the width of the parent element and a width of the viewport. In some implementations, the ratio match value for each predetermined standard content item size may be based, at least in part, on a ratio of a first dimension of the standard content item size, such as a width dimension, to the width of the parent element. In a further implementation, the ratio match value for each predetermined standard content item size may be based, at least in part on a ratio of a second dimension of each standard content item size, such as a height dimension, to the width of the viewport less the width of the parent element. Once each eligible standard content item size of the set of standard content item sizes is ranked, then the top ranked standard content item size may be determined.

A content item may be requested by the client device from a content item selection system (block 614) for each portion of the resource needing a third-party content item. The content item request may include the height value of the determined standard content item size and the width value of the parent element. In other implementations, the content item request may include the height value and the width value of the determined standard content item size. The request may be in the form of a content item request URL. In some implementations, device and/or the resource information or parameters may also be included with the content item request, such as appended to a content item request URL (e.g., /page/contentitem?devid=abc123&devnfo=A34r0).

A content item served in response to the content item request may be displayed with the resource (block 616). The client device may receive data to effect display of a served content item from a content item selection system. Using the received data, the client device may display the served content item with the resource.

In some implementations, the process 600 may determine a second content item size based on a second size of the viewport and/or a second width of the parent element (block 608, 610, 612). For example, as shown in FIGS. 2B and 3B, a resource may be modified or resized in response to a reduction in size to a web browser window or an orientation change of a mobile device or tablet. The script may be configured to query the DOM to find the parent element of the where ins class='contentitem'/ins or div class='contentitem'/div is located and query the DOM for the new width of the parent element. The new height of the parent element may also be queried and used in the determination of the second content item size. In some instances, the client device may request a second content item from the content item selection system (block 614) and display the served second content item with the resource (block 616). In other implementations, the script may be configured to cause the client device to resize the originally served content item based on the determined second content item size (e.g., via seam carving, stretching, etc.). In some implementations, the served second content item may be the same as previous served content item but having a size according to the determined second content item size.

Figure 7:
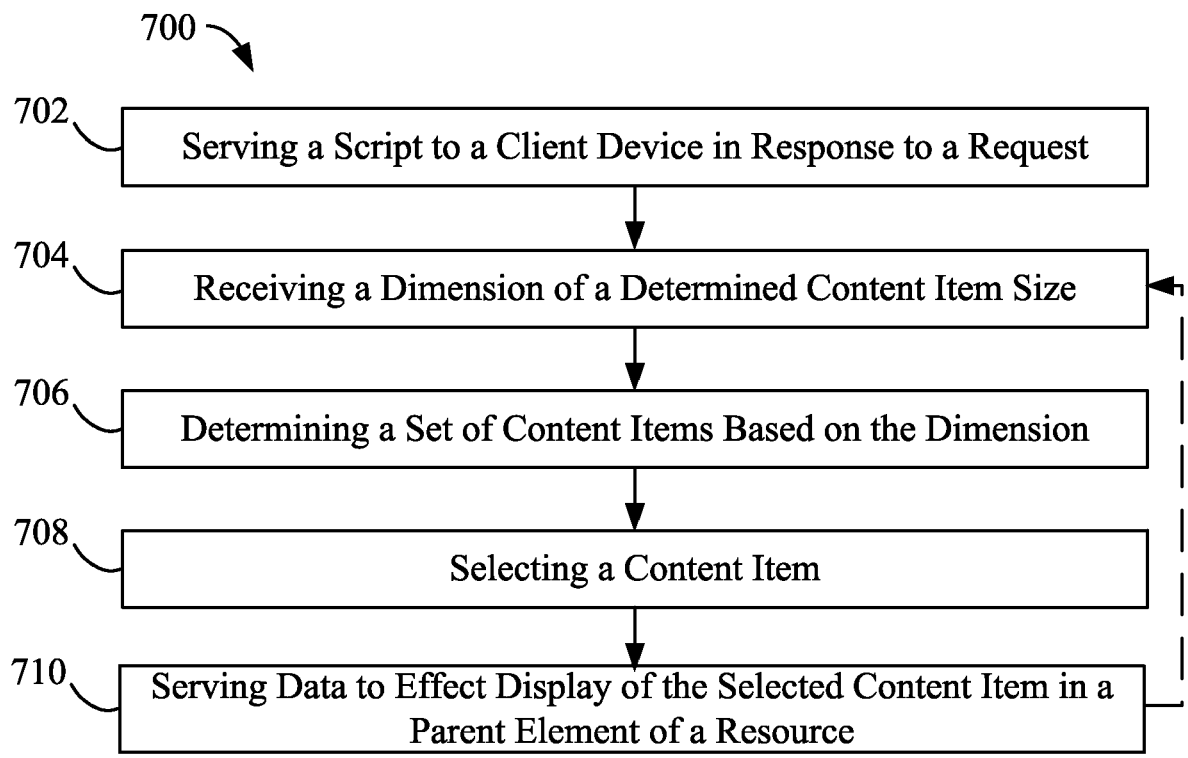
FIG. 7 is a flow diagram of an implementation of a process to select and serve a content item based on an automatic determination of a size for the content item.

FIG. 7 depicts an example flow diagram of a process 700 that may be implemented by a content item selection system, such as content item selection system 108 of FIG. 1, to select and serve a content item based on an automatic determination of a size for the content item. The process 700 includes serving a script to a client device in response to a request (block 702). The script is configured to cause the client device to perform several operations described herein, including one or more of the operations described in reference to blocks 606, 608, 610, 612 of FIG. 6. For example, the script may be configured to cause the client device to cause the client device to locate the portions of the resource where third-party content items will be served and a size determination is needed, determine a size of a viewport, determine a width of a parent element for each portion where a third-party content item will be served, and/or determine a content item size for each portion where third-party content items will be serve. In some implementations, the height of the parent element may also be used in the determination of the content item size.

The determination of the content item size may be based, at least in part, on the size of the viewport and the width of a parent element of the resource, as described in greater detail herein. The content item size determination may include selecting a predetermine standard content item size based on a ranking of each predetermined standard content item size. The set of standard sizes that may be eligible for ranking may be subject to additional limitations in some implementations. For example, a predetermined standard content item size may not be ranked if the standard size exceeds a threshold value for a predetermined percentage of a viewport area, such as a threshold value of 15% of the area of the viewport. Once the set of eligible standard content item sizes is determined, each standard content item size of the set of standard content item sizes may be ranked. The ranking may be based, at least in part, on an area of each predetermined standard content item size, an estimated revenue value of each predetermined standard content item size, and/or a ratio match value. In some implementations, the rating for each standard content item size may be based on the equation:

Rating=Area*eRPM*ratio_match

In some implementations, each multiplier in the equation may be weighted. The area of each predetermined standard content item size may be the pixel area of the predetermined standard content item size. The estimated revenue value for a predetermined standard content item size (i.e., estimated revenue per thousand impressions or eRPM in the equation above) may be a value determined for each predetermined standard content item size based on global data for that particular predetermined standard content item size. In other implementations, the estimated revenue value for a predetermined standard content item size may a value that is publisher-specific, website specific, webpage specific, and/or location-specific.

The ratio match value may be based, at least in part, on the width of the parent element and a width of the viewport. In some implementations, the ratio match value for each predetermined standard content item size may be further based, at least in part, on a ratio of a first dimension of the standard content item size, such as a width dimension, to the width of the parent element. In a further implementation, the ratio match value for each predetermined standard content item size may be based, at least in part on a ratio of a second dimension of each standard content item size, such as a height dimension, to the width of the viewport less the width of the parent element. Once each eligible standard content item size of the set of standard content item sizes is ranked, then the top ranked standard content item size may be determined by the client device. In some implementations, the script may be further configured to case the transition display of the resource once the content item size is determined. For example, the script may include "transition: height 0.5s case-out;" to cause the client device to case the height out to the height of the determine content item size over half a second to smoothly expand the resource displayed on a display of the client device.

A dimension, such as a height or a width, of the determined content item size may be received (block 704). The dimension of the determined content item size may be received as part of a content item request from a client device. The content item request may also include a dimension of the parent element, such as a width value or a height value. In one implementation, the content item request may include the height value of the determined standard content item size and the width value of the parent element. The request may be in the form of a content item request URL. In some implementations, device and/or the resource information or parameters may also be included with the content item request, such as appended to a content item request URL (e.g., /page/contentitem?devid=abc123&devnfo=A34r0).

A set of content items may be determined based, at least in part, on the received dimension of the determined content item size (block 706). In some implementations, image content items having a content item size corresponding to the determined content item size, based on the received dimension, may be included in the set of content items for an auction to be performed by the content item selection system. The set of content items may also include textual content items or other content items. A content item may be selected (block 708) based, at least in part, on an auction performed by the content item selection system. The selection of the content item may be based on a bid associated with each content item of the set of content items in the auction. In some implementations, a score may be generated for each content item of the set of content items in the auction and the score may be used to rank each content item of the set of content items. A content item may be selected based on the rank by the content item selection system.

Data to effect display of the selected content item in a parent element of a resource (block 710). The data may be transmitted from the content item selection system 108 to a client device 110 and/or resource server 104 via the network 106.

In some implementations, the process 700 may receive a dimension of a second content item size based on a second size of the viewport and/or a second width of the parent element as determined by the script, such as that described in reference to blocks 608, 610, 612 of FIG. 6. For example, as shown in FIGS. 2B and 3B, a resource may be modified or resized in response to a reduction in size to a web browser window or an orientation change of a mobile device or tablet. In some instances the process 700 may further include receiving a dimension of the determined second content item size and serving second data to the client device to effect display of the selected content item with the resource based on the dimension of the determined second content item size. In other implementations, the script may be configured to cause the client device to resize the originally served content item based on the determined second content item size (e.g., via seam carving, stretching, etc.).

In some implementations, the dimensions of the determined content item size included in the content item request may be stored in a database of the content item selection system or another system. The dimensions of the served content item may also be stored in the database. In addition, any specific requested shapes, e.g., vertical, horizontal, and/or rectangular, may be stored in the database. The requested dimensions and served dimensions may be integer widths and heights. The requested shapes may be defined as an enum. The stored requested dimensions, served dimensions, and/or the requested shapes may be used to generate reporting data, such as numerical data or a visualization. The requested width dimensions may be bucketized into buckets such as <120 px, >=120 px<125 px, >=125 px<160 px, >=160 px<180 px, >=180 px<200 px, >=200 px<234 px, >=234 px<250 px, >=250 px<300 px, >=300 px <320 px, >=320 px<336 px, >=336 px<468 px, >=468 px<728 px, >=728 px<970 px, and/or >=970 px. Thus, statistical data may be generated for a first-party content provider of a resource regarding the performance of various sized content items and/or for a third-party content provider regarding the performance of their various sized content items.

In some implementations, one or more operations of the script may be performed by the content item selection system. For example, the script may be configured to output the viewport size and the parent element width to the content item selection system and the content item selection system may be configured to determine the content item size, determine a set of content items based on the determined content item size, select a content item, and serve the selected content item to the client device to be displayed in the parent element with the resource.

Figure 8:
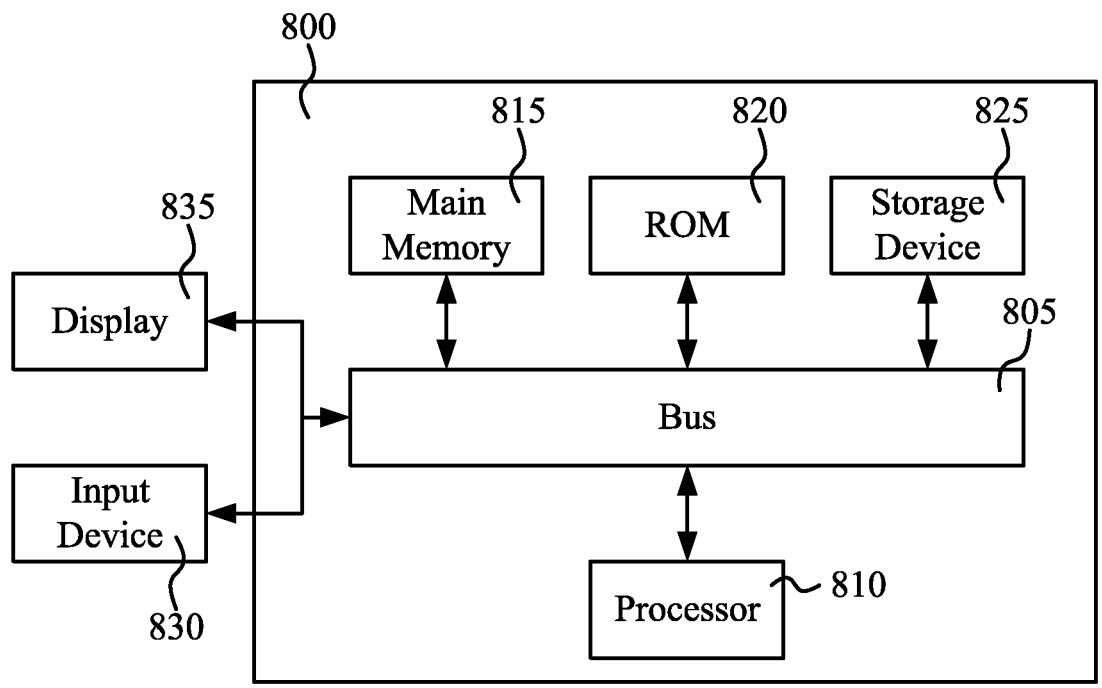
FIG. 8 is a is a block diagram illustrating a general architecture for a computer system that may be employed to implement various elements of the systems and methods described and illustrated herein.

FIG. 8 is a block diagram of a computer system 800 that can be used to implement the client device 110, content item selection system 108, third-party content server 102, resource server 104, etc. The computing system 800 includes a bus 805 or other communication component for communicating information and a processor 810 or processing module coupled to the bus 805 for processing information. The computing system 800 can also include one or more processors 810 or processing modules coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," or "processing module"

encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for selecting and serving a content item based on a determined content item size for a resource, the method comprising:
    serving, using a processing module, a script to a client device in response to a request, the script configured to:
        determine a size of a viewport,
        determine a width of a parent element of a resource, and
        determine a content item size based, at least in part, on the size of the viewport and the width of the parent element;

receiving, from the client device and at a processing module, information indicative of the determined content item size;
determining, using a processing module, a set of content items based, at least in part, on the received information indicative of the determined content item size;
selecting, using a processing module, a content item from the determined set of content items; and
serving, using a processing module, data to effect display of the selected content item in the parent element with the resource.

2. The method of claim 1, wherein the determined content item size is selected from a set of predetermined standard sizes.

3. The method of claim 1, wherein the script is further configured to rank each predetermined standard size of a set of predetermined standard sizes, wherein the ranking is based, at least in part, on an area of each predetermined standard size, an estimated revenue value of each predetermined standard size, and a ratio match value.

4. The method of claim 3, wherein the ratio match value is based, at least in part, on the width of the parent element and a width of the viewport.

5. The method of claim 4, wherein the ratio match value is based, at least in part, on a ratio of a first dimension of each predetermined standard size to the width of the parent element.

6. The method of claim 5, wherein the ratio match value is further based, at least in part, on a ratio of a second dimension of each predetermined standard size to the width of the viewport less the width of the parent element.

7. The method of claim 3, wherein a predetermined standard size of the set of predetermined standard sizes is not ranked if an area of the predetermined standard size exceeds a predetermined percentage of an area of the viewport.

8. The method of claim 1, wherein the script is further configured to determine a second content item size based, at least in part, on a second size of the viewport and a second width of the parent element.

9. The method of claim 8, further comprising:
receiving, at a processing module, information indicative of the determined second content item size; and
serving, using a processing module, second data to the client device to effect display of the selected content item with the resource based on the information indicative of the determined second content item size.

10. The method of claim 8, wherein the script is further configured to resize the selected content item based on the determined second content item size.

11. A system for serving content items comprising:
one or more processing modules; and
one or more storage devices storing instructions that, when executed by the one or more processing modules, cause the one or more processing modules to perform operations comprising:
serving a script to a client device in response to a request, the script configured to:
determine a size of a viewport,
determine a width of a parent element of a resource, and
determine a content item size based, at least in part, on the size of the viewport and the width of the parent element;
receiving, from the client device, information indicative of the determined content item size;
determining a set of content items based, at least in part, on the received information indicative of the determined content item size;
selecting a content item from the determined set of content items; and
serving data to effect display of the selected content item in the parent element with the resource.

12. The system of claim 11, wherein the determined content item size is selected from a set of predetermined standard sizes.

13. The system of claim 11, wherein the script is further configured to rank each predetermined standard size of a set of predetermined standard sizes, and wherein the ranking is based, at least in part, on an area of each predetermined standard size, an estimated revenue value of each predetermined standard size, and a ratio match value.

14. The system of claim 13, wherein the ratio match value is based, at least in part, on the width of the parent element and a width of the viewport.

15. The system of claim 14, wherein the ratio match value is based, at least in part, on a ratio of a first dimension of each predetermined standard size to the width of the parent element.

16. The system of claim 15, wherein the ratio match value is further based, at least in part, on a ratio of a second dimension of each predetermined standard size to the width of the viewport less the width of the parent element.

17. The system of claim 13, wherein a predetermined standard size of the set of predetermined standard sizes is not ranked if an area of the predetermined standard size exceeds a predetermined percentage of an area of the viewport.

18. The system of claim 11, wherein the script is further configured to determine a second content item size based, at least in part, on a second size of the viewport and a second width of the parent element.

19. The system of claim 18, wherein the operations further comprise:
receiving, at a processing module, information indicative of the determined second content item size; and
serving, using a processing module, second data to the client device to effect display of the selected content item with the resource based on the information indicative of the determined second content item size.

20. The system of claim 18, wherein the script is further configured to resize the selected content item based on the determined second content item size.

* * * * *